United States Patent
Yamauchi et al.

(10) Patent No.: US 9,074,865 B2
(45) Date of Patent: Jul. 7, 2015

(54) CONTOUR AND SURFACE TEXTURE MEASURING INSTRUMENT AND CONTOUR AND SURFACE TEXTURE MEASURING METHOD

(71) Applicant: Tokyo Seimitsu Co., Ltd., Hachioji-shi, Tokyo (JP)

(72) Inventors: Yasuhiro Yamauchi, Hachioji (JP); Takashi Fujita, Hachioji (JP)

(73) Assignee: Tokyo Seimitsu Co., Ltd., Hachioji-shi (JP)

( * ) Notice: Subject to any disclaimer, the term of this patent is extended or adjusted under 35 U.S.C. 154(b) by 0 days.

(21) Appl. No.: 14/363,284

(22) PCT Filed: Dec. 10, 2012

(86) PCT No.: PCT/JP2012/081972
§ 371 (c)(1),
(2) Date: Jun. 5, 2014

(87) PCT Pub. No.: WO2013/103070
PCT Pub. Date: Jul. 11, 2013

(65) Prior Publication Data
US 2014/0331511 A1      Nov. 13, 2014

(30) Foreign Application Priority Data

Jan. 4, 2012  (JP) ................................. 2012-000069
Jul. 9, 2012   (JP) ................................. 2012-153517

(51) Int. Cl.
*G01B 5/20*  (2006.01)
*G01B 21/20* (2006.01)
(Continued)

(52) U.S. Cl.
CPC  *G01B 5/20* (2013.01); *G01B 21/20* (2013.01); *G01B 21/30* (2013.01); *G01B 5/28* (2013.01)

(58) Field of Classification Search
CPC ............ G01B 5/20; G01B 5/28; G01B 21/20; G01B 21/30
USPC .............................................. 33/553, 554, 551
See application file for complete search history.

(56) References Cited

U.S. PATENT DOCUMENTS 3,886,542 A * 5/1975 Ohtsuka ............................ 341/9
4,829,342 A * 5/1989 Nishimura ..................... 356/494
(Continued)

FOREIGN PATENT DOCUMENTS

DE  10 2005 018 919   11/2006
DE  10 2007 019 833   10/2008
(Continued)

OTHER PUBLICATIONS

International Search Report for PCT/JP2012/081972, mailed Mar. 5, 2013, 4pp.
(Continued)

Primary Examiner — Christopher Fulton
(74) Attorney, Agent, or Firm — Christie, Parker & Hale, LLP

(57) ABSTRACT

A contour and surface texture measuring instrument for measuring a contour and surface texture of a surface of a work, which generates a displacement signal having a high resolution and high linearity in a wide measurement range is disclosed, the contour and surface texture measuring instrument having a measurement part having a stylus configured to come into contact with the surface of the work and to change its position vertically, a feed mechanism configured to move the work with respect to the stylus, an arm having the measurement part at one end and configured to transfer a displacement of the stylus to rotate with a pivot, and a differential transformer-type measuring mechanism and a scale-type measuring mechanism attached to the arm or to a position interlocked with the arm and configured to detect a displacement of the stylus.

7 Claims, 15 Drawing Sheets

(51) Int. Cl.
*G01B 21/30* (2006.01)
*G01B 5/28* (2006.01)

(56) References Cited

U.S. PATENT DOCUMENTS 6,987,388 B2 * 1/2006 Oguri .......................... 324/534
2014/0283402 A1 * 9/2014 Hidaka et al. .................. 33/556

FOREIGN PATENT DOCUMENTS

| EP | 1 394 499 A1 | 3/2004 |
|---|---|---|
| JP | 52-26249 | 2/1977 |
| JP | 61-25009 | 2/1986 |
| JP | 5-141902 | 6/1993 |
| JP | 6-507706 | 9/1994 |
| JP | 2000-018935 | 1/2000 |
| JP | 2000-74616 | 3/2000 |
| JP | 2004-069510 | 3/2004 |
| JP | 2004-077437 | 3/2004 |
| JP | 2008-304332 | 12/2008 |
| WO | WO 92/21934 | 12/1992 |

OTHER PUBLICATIONS

Office action issued in corresponding German Patent Application No. 11 2012 006 115.2, dated Mar. 6, 2015 including English translation, 11 Pages.

* cited by examiner

Fig.2
PRIOR ART
(A)
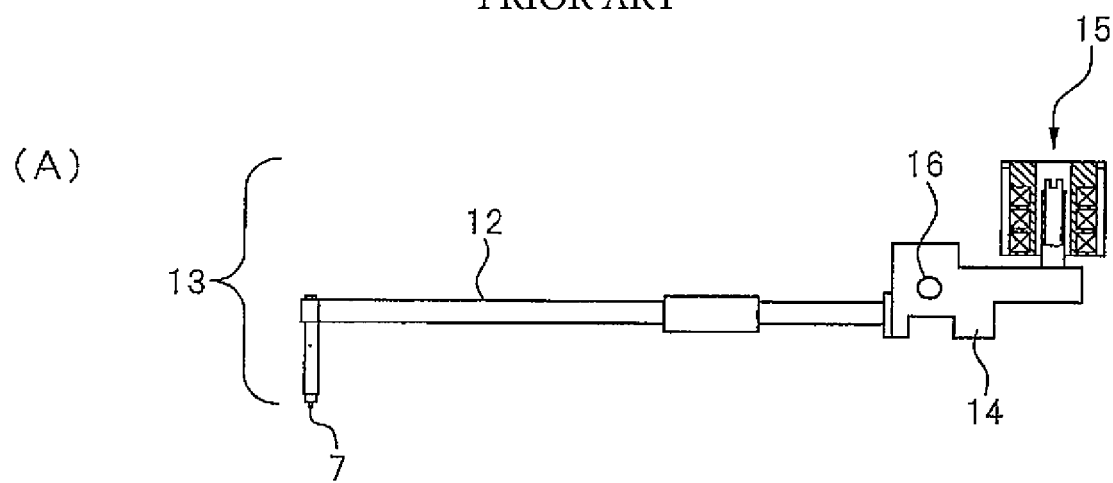
(B)
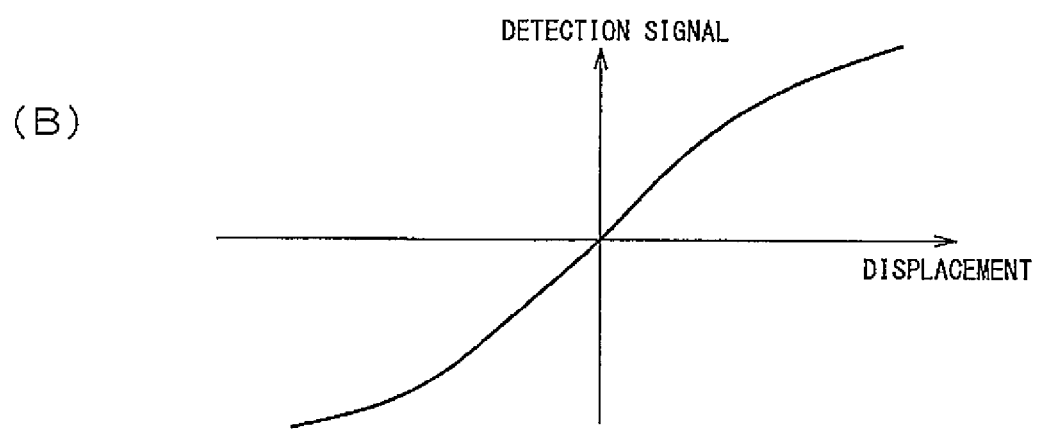

Fig.3
PRIOR ART
(A)
(B)
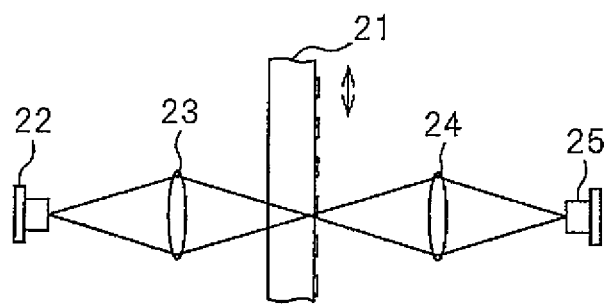
(C)
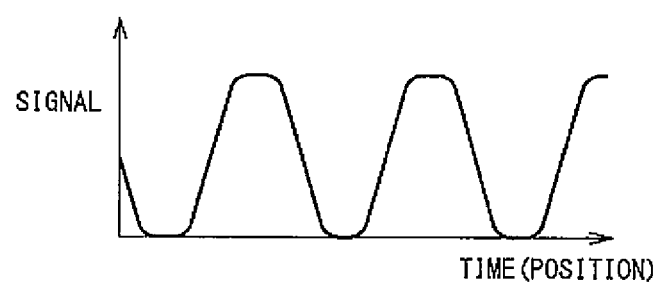

Fig.4
PRIOR ART
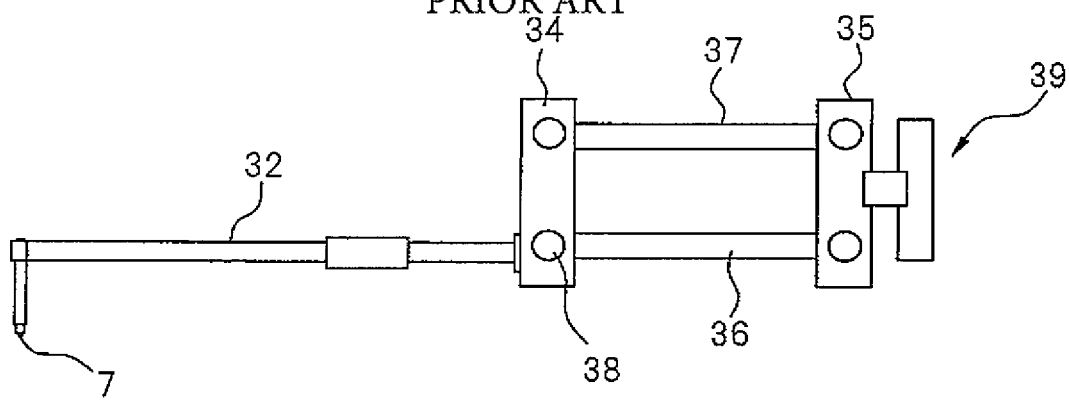
Fig.5
PRIOR ART
(A)
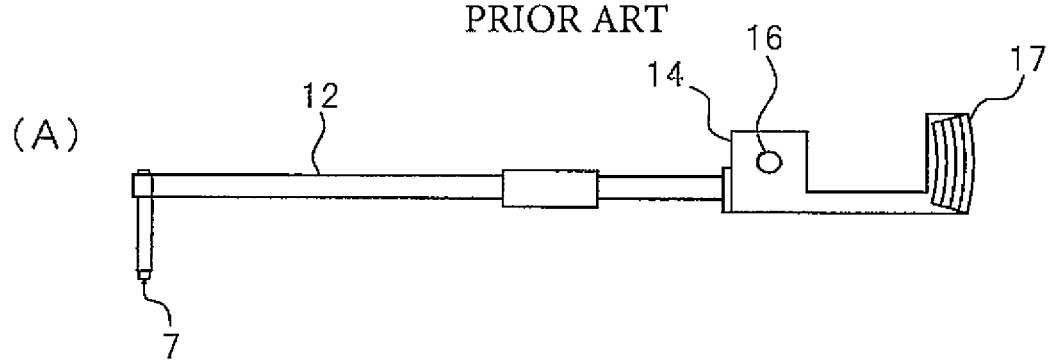
(B)
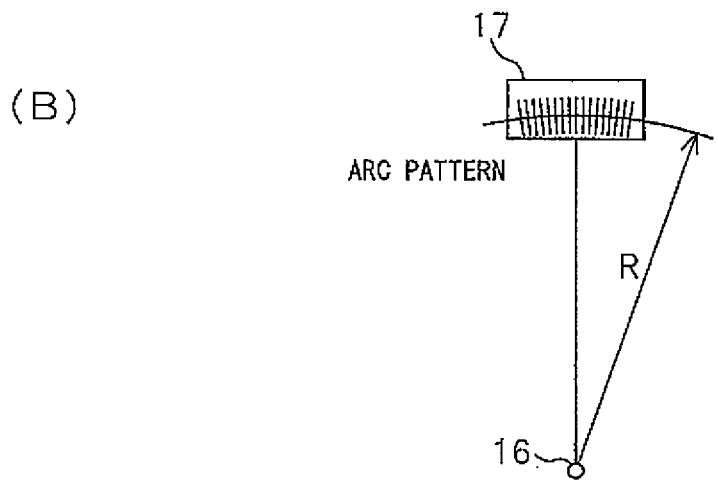

Fig.9
(A) 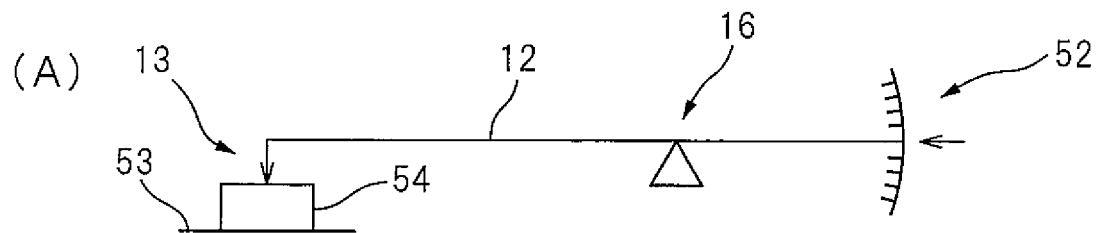
(B) 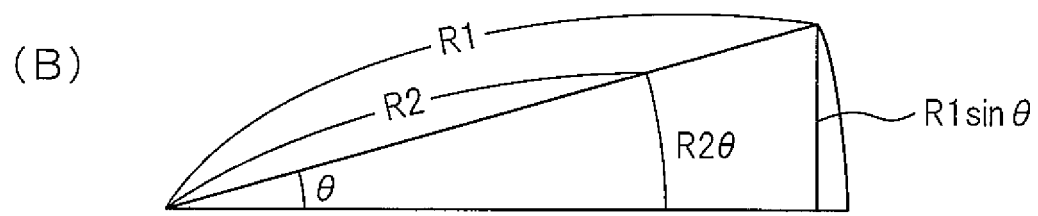
(C) 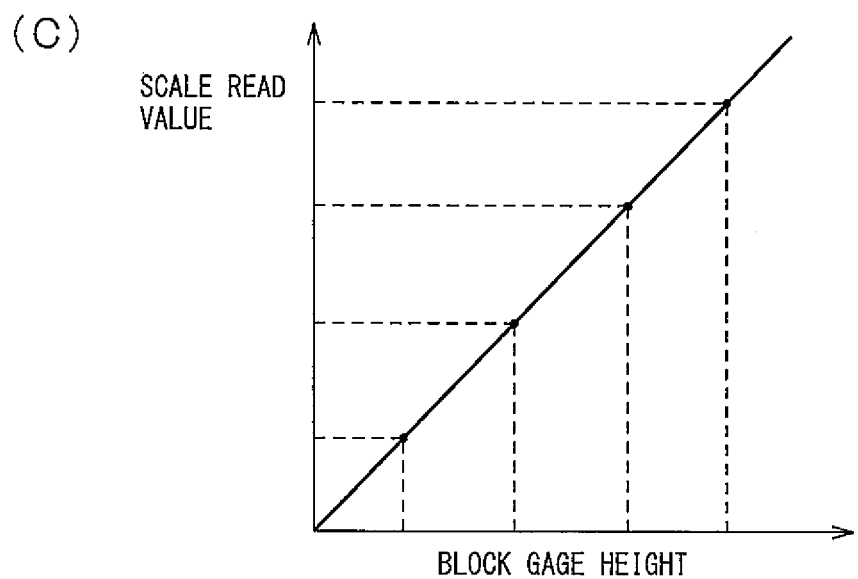

Fig.10
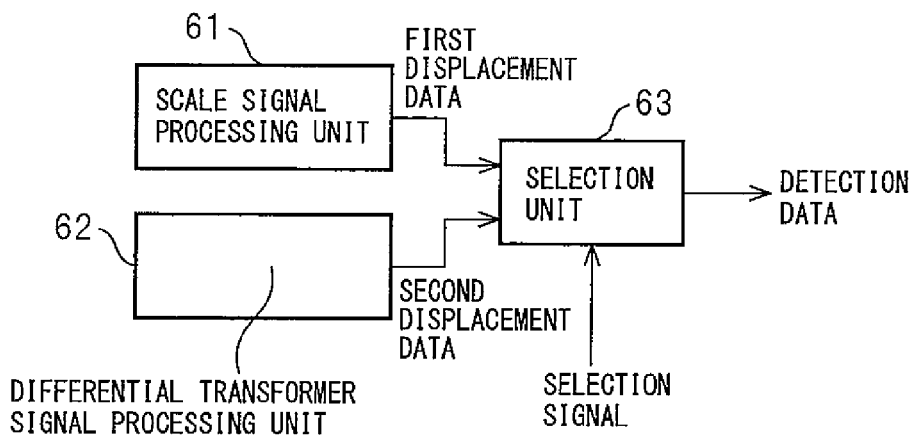
Fig.11
(A)
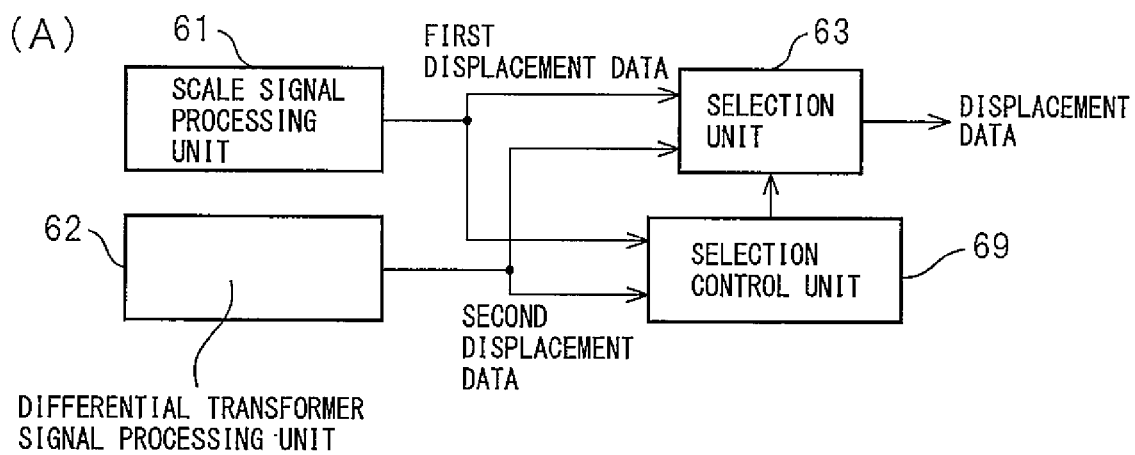
(B)
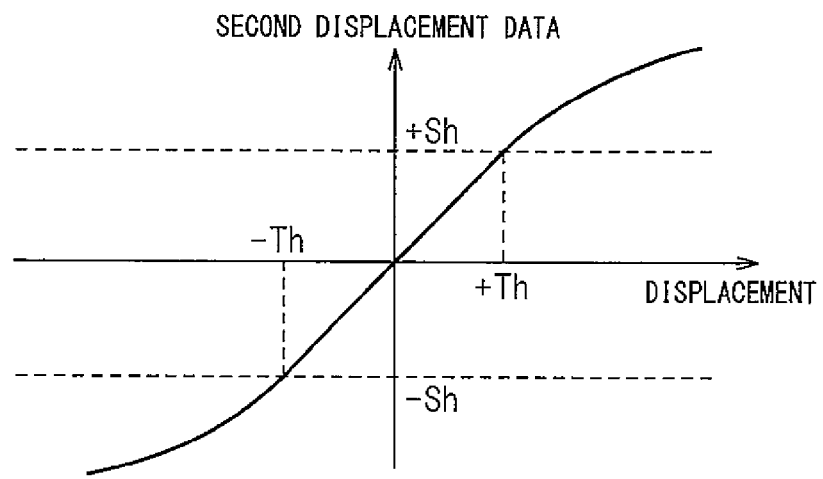

CONTOUR AND SURFACE TEXTURE MEASURING INSTRUMENT AND CONTOUR AND SURFACE TEXTURE MEASURING METHOD

CROSS-REFERENCE TO RELATED APPLICATION(S)

This application is a National Phase Patent Application and claims priority to and the benefit of International Application Number PCT/JP2012/081972, filed on Dec. 10, 2012, which claims priority to Japanese Patent Application Number 2012-000069, filed on Jan. 4, 2012 and Japanese Patent Application Number 2012-153517, filed on Jul. 9, 2012, the entire disclosures of which are incorporated herein by reference.

TECHNICAL FIELD

The present invention relates to a contour and surface texture measuring instrument and a contour and surface texture measuring method.

BACKGROUND ART

A surface texture measuring instrument for measuring surface texture of a work and a contour measuring instrument for measuring a surface profile (contour) of a work are widely used. The surface texture measuring instrument detects minute recesses and protrusions on the work surface and detects a change in height along a minute length on the work surface, i.e., a change in height in a short period. In contrast, the contour measuring instrument detects a change in height in a comparatively long period on the work surface. In other words, the difference between the surface texture measuring instrument and the contour measuring instrument lies in the minuteness of displacement of the stylus to be detected, i.e., the period range to be detected of the period component corresponding to the length in the detection signal obtained when relatively moving the detection unit at a fixed speed with respect to the work. Because of this, the displacement detector (sensor) used in the surface texture measuring instrument is required to have high-speed responsibility and to be capable of detecting a minute displacement, i.e., to have a high resolution, however, is not necessary to have such strict detection accuracy with regard to the absolute value of the displacement in a long period, i.e., the linearity of the detection signal in a wide detection range. In other words, the linearity of the detection signal in a wide detection range is allowed to have comparatively low accuracy. In contrast to this, the displacement detector (sensor) used in the contour measuring instrument is not required to have so high-speed responsibility as in the case of the surface texture measuring instrument and is not necessary to be capable of detecting a minute displacement (high resolution), however, is necessary to have high accuracy with regard to the absolute value of displacement in a long period, i.e., the linearity in a wide detection range of the detection signal.

In general, by taking into consideration the characteristics of the measurement as described above, the moving speed when relatively moving the detection unit with respect to the work is different between the case where surface texture is measured and the case where the contour is measured. Specifically, the moving speed in the case where surface texture is measured is low compared to the moving speed in the case where the contour is measured.

The contour measuring instrument and the surface texture measuring instrument have similar configurations and a measuring instrument capable of measuring both the surface profile (contour) and the surface texture is demanded.

FIG. 1 is an external appearance diagram of a contour and surface texture measuring instrument.

As illustrated in FIG. 1, a contour and surface texture measuring instrument 1 has a base 2, a strut 3 provided on the base 2, an X-axis drive unit 4 slidably supported by the strut 3 in a Z-axis direction, an X arm 5 supported by the X-axis drive unit 4 movably in an X-axis direction, a measurement part 6 provided at the tip end of the X arm 5, and a mounting table 8 provided on the base 2.

In the case where measurement is performed, a stylus 7 provided at the tip end part of the displacement detector 6 is caused to come into contact with the surface of a work W mounted on the mounting table 8 with a fixed force. In this state, if the arm support unit 5 and the displacement detector 6 are moved along the X axis by the X-axis drive unit 4, the stylus 7 changes its position in the Z-axis direction in accordance with the profile of the surface of the work W. The displacement detector 6 outputs an electric signal in accordance with the displacement of the stylus 7 by a built-in sensor, for example, such as a differential transformer.

FIG. 2 is a diagram illustrating a configuration example of the displacement detector 6 in the case where a differential transformer is used and an example of a detection signal: in FIG. 2, (A) illustrates a configuration example and (B) illustrates an example of a detection signal.

As illustrated in (A) of FIG. 2, the displacement detector 6 has a holder 14 rotatably supported by a pivot 16 engaged with a case, an arm 12 locked to the holder 14 in an attachable and detachable manner, the stylus 7 provided at the tip end of the arm 12, and a differential transformer-type detection mechanism (sensor) 15 configured to output a signal in accordance with the displacement of the holder 14. A portion attached to the tip end of the arm 12 and including the stylus 7 is called a probe 13. The differential transformer-type detection mechanism (sensor) 15 has a fixed portion including a plurality of coils fixed to the displacement detector 6 and an iron core portion attached to the holder 14 and the position of the iron core portion relative to the plurality of coils of the fixed portion changes due to the rotation of the holder 14 and the intensity of an alternating-current signal (detection signal) that occurs in the coil changes. The differential transformer-type sensor is widely known, and therefore, more explanation is omitted.

When the probe 13 is attached to the holder 14 and the stylus 7 is caused to come into contact with the work surface under a predetermined pressure, in accordance with the contact position, i.e., in accordance with the height and the recesses and protrusions of the work surface, the probe 13 and the holder 16 rotate, the iron core portion of the differential transformer-type sensor changes its position, and a detection signal in accordance with the displacement is output. The intensity of the detection signal of the differential transformer-type sensor changes substantially in proportion to the displacement and changes in accordance with a very minute displacement, but the intensity does not change perfectly in proportion to the displacement and as illustrated in (B) of FIG. 2 and a difference from the value in the case of the perfect proportion increases on both sides of the detectable range, i.e., the linearity deteriorates.

Because of this, in the surface texture measuring instrument required to be capable of detecting a minute displacement, i.e., to have a high resolution, but not required to have so strict detection accuracy with regard to the absolute value of a displacement in a long period, the differential transformer-type sensor is used in many cases.

In the case where the differential transformer-type sensor is used in the contour measuring instrument, calibration of the differential transformer-type sensor is performed in advance and by preparing a correction table storing a deviation between displacement and detection signal to make correction, the linearity is improved. However, the differential transformer-type sensor is susceptible to the change in temperature and it is difficult to implement sufficient linearity only by this correction.

On the other hand, as a displacement detector having high linearity in a wide detection range, a scale-type detection mechanism (sensor) is known. The scale-type sensor has a scale recording graduations and detects the amount of change in graduation accompanying movement or the position to which the scale has moved. The scales are of several kinds: an optical scale, a magnetic scale, etc.

FIG. 3 is a diagram explaining an optical scale-type detection mechanism (sensor): in FIG. 3, (A) illustrates an example of graduations of the scale used in the optical scale-type sensor, (B) illustrates a configuration example of the detection unit of the optical scale-type sensor, and (C) illustrates an example of the detection signal, respectively.

As illustrated in (A) of FIG. 3, the graduations of a scale 21 form a black and white pattern formed on a glass plate, etc., and the black portion is formed by vapor deposition of chromium etc.

As illustrated in (B) of FIG. 3, a detection unit is provided so as to sandwich the scale 21 that moves. In the detection unit, a light source 22, such as an LED and laser, and a lens 23 that converges light from the light source 22 onto the surface on which the black and white portions of the scale 21 are formed are provided on one side of the scale 21, and a lens 24 that collects light having passed through the scale 21 and a light receiving element 25 that detects light collected by the lens 24 are provided on the other side of the scale 21.

The amount of light received by the light receiving element 25 changes depending on whether the white portion or the black portion of the scale 21 is located on the portion of the light flux collected by the lens 23 when the scale 21 moves. Therefore, a detection signal that changes as illustrated in (C) of FIG. 3 is obtained. By processing this detection signal, it is possible to detect the amount of movement of the scale 21 or the position to which the scale 21 has moved.

FIG. 4 is a diagram illustrating a configuration example of a displacement detector that uses the optical scale-type sensor. As illustrated in FIG. 4, the displacement detector has a parallel link mechanism in which link members 34 and 35 are linked by two links 36 and 37. The links 36 and 37 are engaged with four rotation shafts of the link members 34 and 35 and it is possible for the link members 34 and 35 and the links 36 and 37 to have a state where the link members 34 and 35 are kept parallel and the links 36 and 37 are kept parallel, i.e., to deform so as to form a parallelogram. One rotation shaft 38 of the four rotation shafts is engaged with a case of the displacement detector and the link 36 is rotatably supported with the rotation shaft 38 as a pivot. An arm 32 at the tip end of which the stylus 7 is provided is locked by the link 36. Consequently, the arm 32 and the link 36 are rotatably supported by the rotation shaft (pivot) 38 in the same manner as the arm 12 and the holder 14 in FIG. 3.

On one side of the link member 35, an optical scale-type sensor 39 is provided, which detects a displacement of the link member 35. In FIG. 4, the scale having graduations is fixed to the case and an index scale, to be described later, is provided to the link member 35. It is also possible to provide a scale to the link member 35 and to provide the detection unit to the case.

In the displacement detector in FIG. 4, the link member 35 moves a small amount in the transverse direction, however, moves parallel, and therefore, it is possible to use the optical scale-type sensor using the scale having graduations as illustrated in (A) of FIG. 3. However, the parallel link mechanism illustrated in FIG. 4 requires a large space.

Because of this, as illustrated in (A) of FIG. 5, in the displacement detector in FIG. 2, a scale 17 in which patterns are formed radially is provided in the holder 14 and by detecting the amount of rotation (rotation position) of the holder 14 by utilizing the scale 17, the displacement of the stylus 7 is detected. In the scale 17, as illustrated in (B) of FIG. 5, black and white patterns with the pivot 16 as the center are formed into an arc shape. In the case where the amount of movement of the pattern in the arc shape is detected also, it is possible to use the same method as that explained in FIG. 3. Further, a method has also been proposed, in which the surface on the rear end side of the holder 14 is formed into a cylindrical surface with the pivot 16 as the center and patterns at regular intervals are formed thereon, and thereby the amount of movement (rotation) of the pattern is optically detected.

As the resolution of the scale-type sensor, basically, the resolution is specified by the pitch of the graduations and various kinds of methods for improving the resolution by using an index scale, etc., have been proposed. Further, the method in which the graduations of the scale 21 are formed as a diffraction grating and the resolution is improved by laser interference has also been proposed. However, the method for forming graduations into a diffraction grating and improving the resolution by laser interference requires a large-scaled configuration and the size thereof becomes large, and therefore, it is difficult to use the method in the displacement detector of the contour/surface texture measuring instrument. There is also such a problem that the configuration to implement this method is complicated, and therefore, expensive.

In any method, the scale-type sensor uses the scale as a reference, and therefore, displacement detection with high accuracy is possible in a wide range, but it is difficult to obtain a resolution as high as the resolution of the differential transformer-type sensor.

A laser interferometer system has been known as a displacement detector capable of displacement detection with high accuracy in a wide range and having a high resolution.

FIG. 6 is a diagram illustrating a configuration of a displacement detector that uses the laser interferometer system. As illustrated in FIG. 6, in the displacement detector in FIG. 2, the holder 14 is provided with a corner cube 43 forming a laser interferometer but not provided with the differential transformer-type detection mechanism (sensor). The laser interferometer has a light source (laser) 41, a beam splitter 42, the corner cube 43, a corner cube 44, two reflection mirrors 45 and 46 provided to the beam splitter 42, and a light receiving element 47.

The laser beam emitted from the light source 41 is split into two beams by the beam splitter 42. One of the split laser beams is reflected from the corner cube 43 and further reflected from the reflection mirror 42 and returns to the corner cube 43, and then is further reflected and enters the beam splitter 42, and is reflected and travels toward the light receiving element 47. The other split laser beam is reflected from the corner cube 44 and further reflected from the reflection mirror 46 and returns to the corner cube 44, and then is further reflected and enters and passes through the beam splitter 42 and travels toward the light receiving element 47. The two laser beams traveling from the beam splitter 42 toward the light receiving element 47 interfere with each other. When the holder 14 changes its position and the corner cube 43 changes its position, the light path length of one of the laser beams changes by four times the amount of displacement of the corner cube 43, and due to this, the difference between the light path lengths of the two laser beams incident on the light receiving element 47 changes and the state of interference changes. One change in light and darkness of interference in the light receiving element 47 corresponds to one wavelength of the laser beam, and therefore, by detecting the one change of the detection signal of the light receiving element 47, it is possible to detect the displacement of the corner cube 43, which is ¼ of one wavelength of the laser beam. If one wavelength of the laser beam is taken to be about 800 nm, it is possible to detect a displacement of 200 nm, and this is a very high resolution. Further, the detection range is also very wide and the linearity is good.

As described above, the displacement detector using the laser interferometer has a high resolution and good linearity, but is very expensive and the assembly and adjustment thereof are complicated.

DISCLOSURE OF THE INVENTION

Problem to be Solved by the Invention

As explained above, the displacement detector (sensor) used for surface texture measurement is necessary to have high-speed responsibility and to be capable of detecting a minute displacement, i.e., to have a high resolution. On the other hand, the displacement detector (sensor) used in the contour measuring instrument is not required to have so high-speed responsibility as that in the case of surface texture measurement and is not necessary to be capable of detecting a minute displacement (not necessary to have a high resolution), however, is necessary to have high accuracy with regard to the absolute value of a displacement in a long period, i.e., the linearity in a wide detection range of the detection signal. Some expensive and large-sized displacement detectors (sensor) adopting the laser system, etc., satisfy both the requirements, but under the present circumstances, it is not possible for an inexpensive and compact displacement detector (sensor) to satisfy both requirements.

Because of this, a contour and surface texture measuring instrument capable of measuring both the surface texture and the surface profile (contour) of a work and having a high resolution and high linearity in a wide measurement range is demanded.

An object of the present invention is to implement a contour and surface texture measuring instrument whose configuration is simple and can be implemented at a low cost, and which has a high resolution and high linearity in a wide measurement range.

Means for Solving the Problem

In order to implement the above-mentioned object, in the contour and surface texture measuring instrument of the present invention, both a scale-type detection mechanism and a differential transformer-type detection mechanism are provided in a displacement detection unit configured to detect the displacement of a stylus, thereby selection of a detection signal suitable to an object to be measured (contents of measurement) is enabled.

In other words, the contour and surface texture measuring instrument of the present invention is a contour and surface texture measuring instrument for measuring the contour and surface texture of the surface of a work and includes a measurement part having a probe configured to come into contact with the surface of the work and to change its position vertically, a feed mechanism configured to relatively move the work with respect to the probe, an arm having the measurement part at one end and configured to transfer a displacement of the probe and to rotate with a pivot as a center, and a differential transformer-type detection mechanism and a scale-type detection mechanism attached to the arm or a position interlocked with the arm and configured to detect the displacement of the probe.

The contour and surface texture measuring method for measuring the contour and surface texture of the surface of a work of the present invention is a contour and surface texture measuring method for measuring the contour and surface texture of a work, the method including: providing both a differential transformer-type detection mechanism and a scale-type detection mechanism configured to detect a displacement of a probe attached to one end of an arm as a displacement of the arm, the probe being configured to come into contact with the surface of the work and to change its position vertically, the arm rotating with a pivot as a center; and measuring a contour and surface texture of the work based on detection results of the differential transformer-type detection mechanism and the scale-type detection mechanism by relatively moving the work in the state where the probe is in contact with the surface of the work.

According to the present invention, the displacement of the same arm is detected simultaneously by both the differential transformer-type detection mechanism and the scale-type detection mechanism, and therefore, it is possible to simultaneously obtain surface texture data detected by the differential transformer-type detection mechanism and contour data detected by the scale-type detection mechanism by one-time measurement. Further, surface texture data and contour data are obtained simultaneously, and therefore, it is possible to select an appropriate detection signal in accordance with the contents of measurement, i.e., whether the contour of the work is measured or the surface texture of the work is measured. As described above, it is possible to appropriately measure the contour and surface texture by one measuring instrument.

The differential transformer-type detection mechanism detects a high frequency component corresponding to a minute displacement, which is roughness of the surface of the work when relatively moving the work with respect to the probe. The scale-type detection mechanism detects a low frequency component of a displacement corresponding to undulation of the surface of the work when relatively moving the work with respect to the probe.

The scale has an arc shape scale and the pitches of the scale are marked continuously, and therefore, it is possible to check the linearity of the scale as a whole. The linear difference in height of an object to be measured is measured, however, in the actual detecting system, the difference is converted into an arc motion rotating with one pivot as a center and the motion is read by the arc-shaped scale.

In such a case, to be precise, a deviation in $\sin \theta/\theta$ occurs (based on the following). In other words, if the distance from the arm pivot position to the probe is taken to be R, the difference in height caused by the displacement when the arm rotates through $\theta$ is $R \sin \theta$. On the other hand, if the distance from the arm pivot position to the scale position is taken to be r, the length on the scale as the result of the displacement when the arm rotates through $\theta$ is $r\theta$. When $\theta$ is in the vicinity of 0 degrees, the error is very small, however, as $\theta$ increases, the error of $\sin \theta/\theta$ increases.

It is possible to find the error such as this by continuously estimating a theoretical amount of deviation due to the angle based on the above-mentioned relationship. Further, in the case of the scale, it is made possible to continuously interpolate the graduations, which will be described later, and therefore, even in the case of the arc scale, it is possible to perform interpolation and make correction with high accuracy because of the continuity of the gradations.

On the other hand, in the case of the differential transformer, it is difficult to cause the difference to correspond to an arc motion with high accuracy. In the case of the arc motion in a wide range, it is difficult in principles to avoid the occurrence of a minute deviation in linearity. If the arm on the probe side is lengthened, there is a case where only a minute arc motion occurs, however, in such a case, it becomes difficult to perform measurement with high sensitivity because of the influence of inertial resistance due to the length of the arm. In order to reduce the inertial resistance of the arm, it is necessary to reduce the length of the arm as much as possible, however, in the case such as this, the necessity of correction of the arc motion is even more urgent.

In these points, the correction of the arc motion by the scale-type detection mechanism is better in terms of preservation of linearity and correction with high accuracy is enabled.

In the case where the differential transformer-type detector and the scale-type detector are combined, the differential transformer-type detector regards responsibility as important and mainly measures a minute displacement and a high frequency roughness component, and therefore, it is preferable to place the differential transformer-type detector nearer to the pivot of rotation than the scale-type detector.

On the other hand, because it is possible for the scale-type detector to correct also the arc motion of the arm with high accuracy, it is desirable to place the scale-type detector farther from the arm pivot than the differential transformer detection mechanism also because the scale-type detector enlarges and evaluates a minute displacement while regarding linearity as important.

The contour and surface texture measuring instrument has a selection unit configured to select and output one of the detection signal of the differential transformer-type detection mechanism and the detection signal of the scale-type detection mechanism.

The contour and surface texture measuring instrument has a correction circuit configured to generate a correction displacement signal by combining the detection signal of the differential transformer-type detection mechanism and the detection signal of the scale-type detection mechanism.

The correction circuit corrects the linearity in a wide range of the detection signal of the differential transformer-type detection mechanism based on the detection signal of the scale-type detection mechanism.

The correction circuit generates a detection signal having a high resolution and good linearity in a wide measurement range by correcting the linearity of the detection signal of the differential transformer-type detection mechanism, the linearity of which is insufficient, by the detection signal of the scale-type detection mechanism.

Effect of the Invention

According to the present invention, a contour and surface texture measuring instrument capable of appropriately measuring the contour of a work and surface texture of a work by one unit is implemented.

Further, in the contour and surface texture measuring instrument having the correction circuit, by correcting the linearity in a wide range of the detection signal of the differential transformer-type detection mechanism based on the detection signal of the scale-type detection mechanism, it is possible to measure the contour and surface texture of a work with a high resolution and high linearity in a wide measurement range.

BRIEF DESCRIPTION OF THE DRAWINGS

FIG. 2 is a diagram illustrating a configuration example of a displacement detector and an example of a detection signal.

FIG. 3 is a diagram explaining an optical scale-type detection mechanism (sensor).

FIG. 4 is a diagram illustrating a configuration example of a displacement detector using the optical scale-type sensor.

FIG. 5 is a diagram illustrating a configuration example of a displacement detector using an optical scale-type sensor having a radial pattern.

FIG. 9 is a diagram explaining creation processing of calibration data of a scale signal processing unit.

FIG. 10 is a diagram illustrating a configuration of a portion configured to process a signal and a selection unit of a second embodiment.

FIG. 11 is a diagram illustrating a configuration of a portion configured to process a signal and a selection unit and selection control processing of a third embodiment.

BEST MODE FOR CARRYING OUT THE INVENTION

Figure 1:
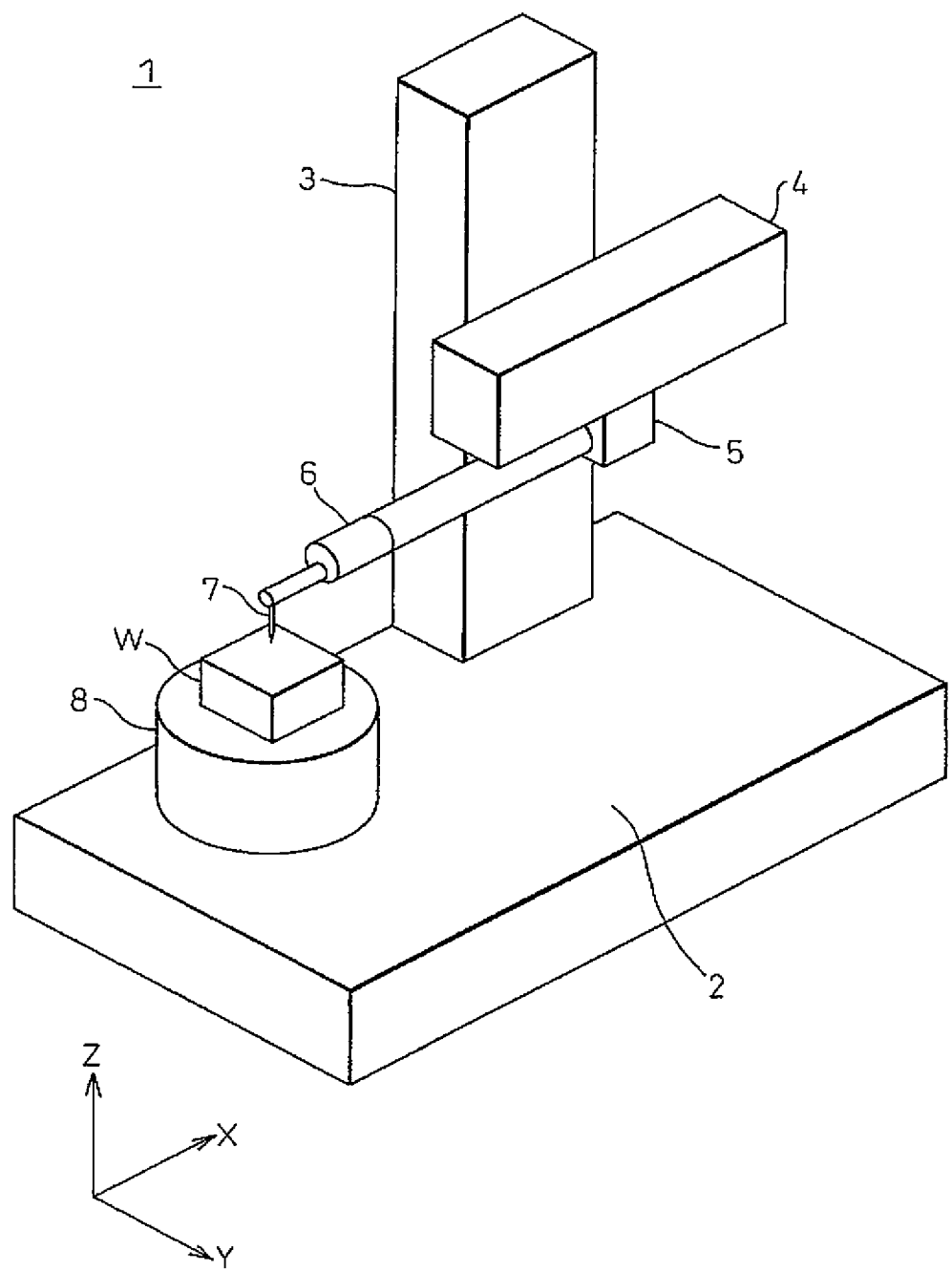
FIG. 1 is an external appearance diagram of a surface texture/profile measuring instrument.
Figure 6:
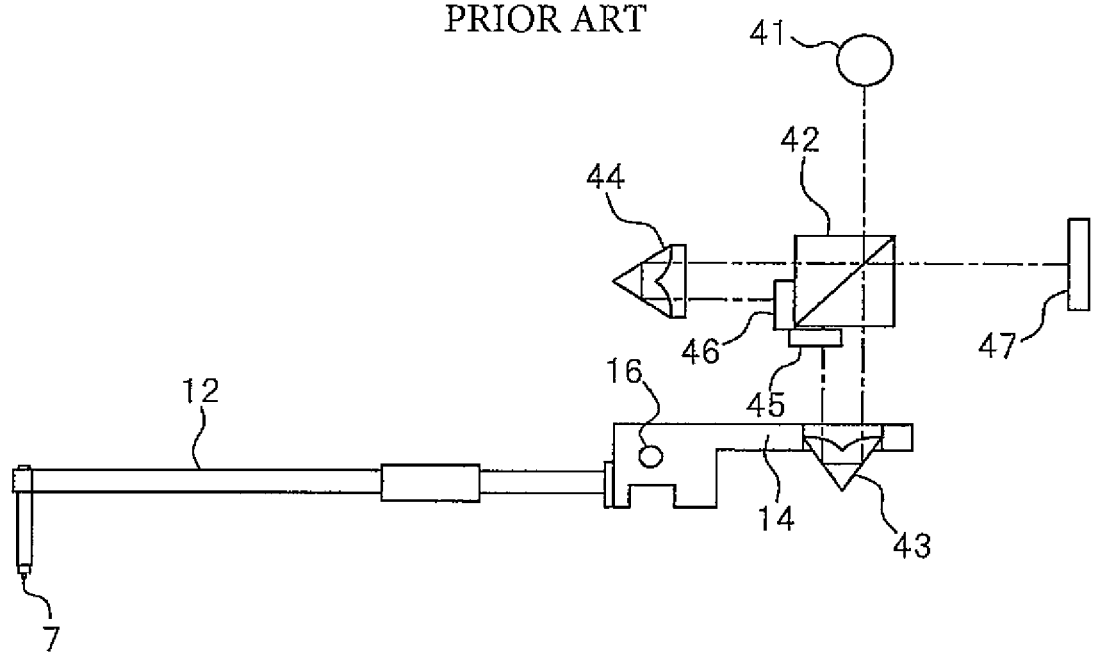
FIG. 6 is a diagram illustrating a configuration of a displacement detector using a laser interferometer system.

Hereinafter, a contour and surface texture measuring instrument of an embodiment of the present invention will be explained. The contour and surface texture measuring instrument of the embodiment has, for example, an external appearance as illustrated in FIG. 1 and the configuration of a displacement detector 6 is different from that in the conventional example. However, the external appearance and the overall configuration are not limited to those illustrated in FIG. 1.

Figure 7:
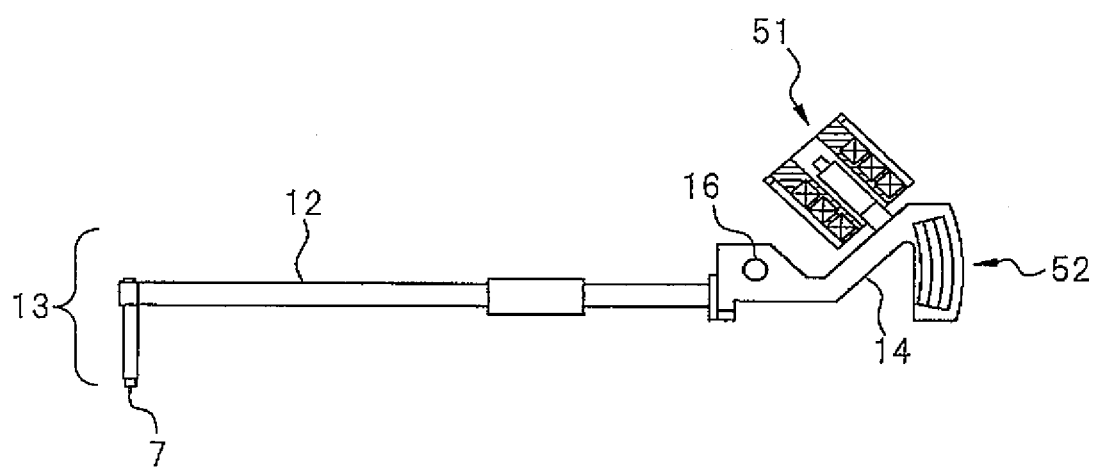
FIG. 7 is a diagram illustrating a configuration of a displacement detector of a contour and surface texture measuring instrument of a first embodiment of the present invention.

FIG. 7 is a diagram illustrating the configuration of the displacement detector 6 of a contour and surface texture measuring instrument of a first embodiment of the present invention.

As illustrated in FIG. 7, the displacement detector 6 of the first embodiment has a holder 14 rotatably supported by a pivot 16 engaged with a case, an arm 12 locked to the holder 14 in an attachable and detachable manner, a stylus 7 provided at the tip end of the arm 12, a differential transformer-type detection mechanism (sensor) 51 configured to output a signal in accordance with a displacement of the holder 14, and a scale-type detection mechanism (sensor) 52 configured to output a signal in accordance with a displacement of the holder 14. A portion attached to the tip end of the arm 12 and including the stylus 7 is called a probe 13. The differential transformer-type detection mechanism 51 has a fixed portion including a plurality of coils fixed to the case of the displacement detector 6 and an iron core portion attached to the holder 14 and by the rotation of the holder 14, the position of the iron core portion relative to the plurality of coils of the fixed portion changes and the intensity of an alternating-current signal (detection signal) that occurs in the coil changes. The scale-type detection mechanism 52 has a scale attached to the holder 14 and having a black and white pattern provided radially with the pivot 16 as a center and a detection unit configured to read a displacement (amount of rotation) of the scale fixed to the case of the displacement detector 6 and when the scale rotates caused by the rotation of the holder 14, the detection unit reads the amount of rotation (position of rotation). It may also be possible to use an index scale in the detection unit.

The differential transformer-type detection mechanism 51 and the scale-type detection mechanism 52 are known widely, and therefore, more detailed explanation is omitted. As described previously, the differential transformer-type sensor has a high resolution and is capable of detecting a minute displacement, however, the linearity of which in a wide detection range is not sufficient. On the other hand, the scale-type sensor is capable of detecting a displacement with high accuracy, but it is difficult to obtain a resolution as high as that of the differential transformer-type sensor.

For example, as the scale-type detection mechanism, the FASTRACK series made by Renishaw, the tape scale, such as ERA700 made by HEIDENHAIN, etc., are appropriately used. Further, a normal stainless scale or an arc scale engraved on a glass surface may be accepted.

The FASTRACK series made by Renishaw described previously is pasted to a curved surface portion with a double-sided tape. On the scale, graduations are continuously marked with 20 μm pitches. In the case of the pasting system with the double-sided tape such as this, a slight deviation etc. may occur due to the accuracy of pasting etc., but it is possible to correct the deviation such as this by measuring in advance a large number of block gages having several thicknesses and performing calibration by drawing an correlation line to check the amount of the deviation. The advantage of utilizing such a scale lies in that correction can be made including linearity based on the continuity because graduations are marked continuously at regular intervals at a large number of points.

In other words, in the case of the scale originally formed into a curved shape, it is difficult to mark graduations at minute regular intervals with high accuracy from the viewpoint of the accuracy of curvature of the curved surface and it will be very expensive to manufacture a scale having strict linearity.

In the case of the tape scale, which is initially manufactured into a straight line shape, it is possible to manufacture a scale with graduations marked with very minute pitches and at regular intervals with high accuracy by linear calibration using laser light etc. When pasting the linear scale to a curved surface, there is a case where a minute error occurs at the time of pasting, but it is made possible to estimate the amount of deviation due to the pasting from the high accuracy and accuracy in continuity of graduations at regular intervals peculiar to the tape scale.

For example, under the environment where the state of temperature is severe, there may be influence of thermal expansion of the scale itself. However, in the case of thermal expansion of the scale resulting from the environment, in general, it is considered that thermal expansion is uniform on the whole, not that part of the scale thermally expands locally.

In the state such as this, it is possible to perform continuous calibration appropriate to the temperature environment by performing calibration sample measurement in several stages in the state and performing calibration at a large number of points.

On the other hand, as to the linearity of the differential transformer, the amount of deviation varies depending on how much the core part of the differential transformer deviates from the coil part. In other words, the linearity does not deviate uniformly but the linearity is lost in accordance with the relative position of the core from the coil.

Consequently, it is recommended to evaluate in advance the amount of deviation in the linearity of the differential transformer-type detector from the scale-type detector in the state of a certain room temperature, and next, to similarly evaluate the deviation in the linearity of the differential transformer-type detector from the scale-type detector in a different temperature environment.

It is possible to evaluate to a certain degree the influence of thermal expansion of the scale in the scale-type detector based on the deviation in linearity due to the environment of temperature of the differential transformer from the scale-type detector.

If a scale having a range of 5 mm with 20 μm pitches is supposed, graduations exist at 250 points therebetween. Based on the continuity of the graduation position, block gages having several thicknesses are measured and measured values of objects to be measured are calculated based on the correlation line. Due to this, it is possible to have the function to perform interpolation even between graduations. In other words, from the continuity of graduation, measurement with higher accuracy is enabled.

On the other hand, in the discrete measurement, it is difficult to make up for the accuracy therebetween. In other words, in the case where calibration is performed based on one point, if a slight error occurs in the absolute accuracy of the one point, the reliability of the entire linearity is lost, but in the case where a large number of points exists continuously at regular intervals, it is possible to check the state of partial deviation in position from the overall collation and to stably secure the accuracy of linearity.

However, in the long-term use, there arises such a problem that the double-sided tape fixing the scale gradually floats and there is a case where the accuracy deviates as a whole. In such a case, it is recommended to observe in advance the relative deviation in accuracy from the differential transformer-type detection mechanism.

Even in the differential transformer-type detection mechanism, in the case where the amount of displacement is small, the linearity is comparatively preserved particularly in the vicinity of the origin. In the case where the deviation is large in each mechanism in the vicinity of the origin, or in the case where the zero-point position deviates in both the detection mechanisms, it is made possible to check the other detection mechanism by taking into consideration the influence of the deviation due to the change over time of the scale or the differential transformer. In the case where such a check function is not provided or in the case where calibration of accuracy cannot be performed on the way because of continuous use, it is not possible to check whether the accuracy has deviated.

According to the calibration of the present application, the displacement that occurs in one arm is checked at all times by two sensors having different detection principles, and therefore, even in the case where the state of one of the sensors is not normal, it is made possible to immediately detect an anomaly from the relative relationship of data therebetween.

Consequently, without the need to frequently perform the calibration task to measure the standard sample, it is possible to automatically diagnose the accuracy of the other detector by checking the consistency of data output from both the sensors, and as a result, it is possible to perform measurement with high accuracy while preserving exactness in the long-term use.

In the first embodiment, the detection signals output from the differential transformer-type detection mechanism 51 and the scale-type detection mechanism 52 are processed in the signal processing unit, not illustrated. It may also be possible to provide the signal processing unit within the case of the displacement detector 6, outside the case of the displacement detector 6, or to provide part of the processing unit within the case of the displacement detector 6 and the rest outside the case of the displacement detector 6.

Figure 8:
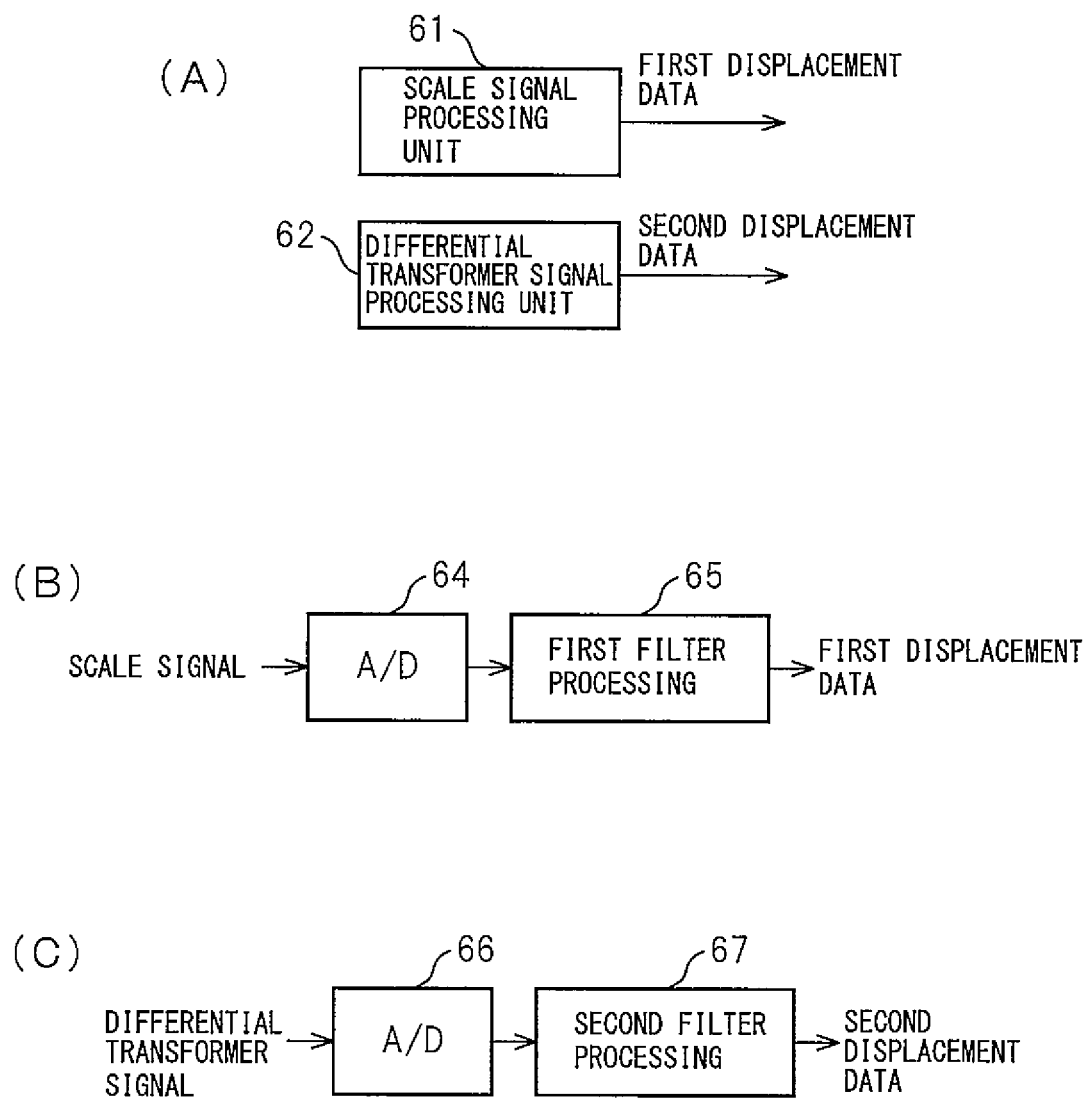
FIG. 8 is a diagram illustrating a configuration of a portion configured to process a signal of the first embodiment.

FIG. 8 is a block diagram illustrating configurations of portions configured to perform signal processing in the contour and surface texture measuring instrument of the first embodiment: in FIG. 8, (A) illustrates an overall configuration, (B) illustrates a configuration of a scale signal processing unit 61, and (C) illustrates a configuration of a differential transformer signal processing unit 62.

As illustrated in FIG. 8(A), the contour and surface texture measuring instrument of the first embodiment has the scale signal processing unit 61 and the differential transformer signal processing unit 62. In the contour and surface texture measuring instrument, measurement is performed by moving the stylus 7 at a fixed speed relative to the surface of the work W, and therefore, the time axis of the detection signals output from the differential transformer-type detection mechanism 51 and the scale-type detection mechanism 52 corresponds to the distance on the surface of the work W. In the processing in the signal processing unit, signal processing is performed by utilizing this.

The scale signal processing unit 61 processes the detection signal output from the scale-type detection mechanism 52 and generates and outputs first displacement data. For example, as illustrated in (B) of FIG. 8, the scale signal processing unit 61 performs A/D conversion processing 64 to convert a signal into a digital signal on the scale signal, which is the detection signal output from the scale-type detection mechanism 52, and further performs first filter processing 65 to remove components having the wavelength or less corresponding to the displacement component in a long distance on the digital signal and generates the first displacement data.

The scale-type detection mechanism 52 detects the displacement in the vertical direction of the probe 13 by converting the displacement into the amount of rotation in the arc scale of the arm 12, and therefore, converts the change in the amount of rotation into the change in height. Conversion can be carried out basically by a conversion expression, but in the actual measuring instrument, there exist various kinds of errors, and therefore, the amount of rotation in the case where the position of the probe 13 is actually changed in the exactly vertical direction, i.e., the detection signal of the scale-type detection mechanism 52 is measured and calibration data is created from the relationship thereof and stored. Then, the actual detection signal is calibrated based on the calibration data.

The scale signal processing unit 61 stores a difference between the detection signal output from the scale-type detection mechanism 52 and the exact displacement when an exact displacement takes place as calibration data and when generating the first displacement data, the scale signal processing unit 61 makes correction also of the calibration data.

FIG. 9 is a diagram explaining creation processing of calibration data of the scale signal processing unit 61. As illustrated in (A) of FIG. 9, at one end of the arm 12 rotatably supported by the pivot 16, the probe 13 is provided, at the other end, part of the scale-type detection mechanism 52 is provided, and the displacement (or the amount of rotation) along the arc of the other end of the arm 12 is detected.

As illustrated in (B) of FIG. 9, the case is considered, where the radius of rotation from the pivot 16 to the probe 13 is taken to be R1, the radius of rotation from the pivot 16 to the arc scale of the scale signal mechanism 52 is taken to be R2, the probe 13 changes its position in the vertical direction, and the arm rotates through θ. In this case, the displacement in the vertical direction of the probe 13 is $R1 \sin \theta$ and the amount of displacement along the arc of the arc scale is $R2\theta$. Consequently, if the amount of displacement along the arc scale of the scale signal mechanism 52 is taken to be d, a displacement D in the vertical direction of the probe 13 is expressed by $D = R1 \sin (d/R2)$.

As described above, in the actual measuring instrument, because there exist various kinds of errors, a deviation (error) from the calculation expression occurs, and therefore, calibration data is created and correction is made. As illustrated in (A) of FIG. 9, a block gage 54 is mounted on a measurement table 53, the pivot 16 is fixed, the probe 13 is caused to come into contact with the block gage 54, and the detection signal output from the scale-type detection mechanism 52 is read. This action is performed for the block gages 54 with different heights. In other words, the block gages with different heights are measured with the viewpoint fixed. By this measurement, the calibration data, which is the difference between the detection signal output from the scale-type detection mechanism 52 and the exact displacement when an exact displacement takes place, is obtained and then is stored. (C) of FIG. 9 is a diagram illustrating an example of a change in the read value of the detection signal of the scale-type detection mechanism 52 when the block gages with different heights are measured.

Returning to FIG. 8, the differential transformer signal processing unit 62 processes the detection signal output from the differential transformer-type detection mechanism 51 and generates second displacement data. It is possible for the differential transformer signal processing unit 62 to output the same displacement data as the conventional data as the second displacement data by performing the same processing as that performed conventionally on the detection signal output from the differential transformer-type detection mechanism 51.

As illustrated in (C) of FIG. 8, the differential transformer signal processing unit 62 performs, for example, A/D conversion processing 66 to convert a signal into a digital signal on the differential transformer signal, which is the detection signal output from the differential transformer-type detection mechanism 51, and further performs second filter processing 67 to remove distortion, noise, etc., of the stylus 7 on the digital signal and generates the second displacement data. In the second filter processing 67, in the case where the radius of the tip end of the stylus 7 is, for example, 2 µm, components of 2.5 µm or less are removed. Further, as explained in (B) of FIG. 2, the detection signal output from the differential transformer-type detection mechanism 51 deteriorates in linearity in the case where the displacement is large, and therefore, it is desirable to create in advance calibration data and to make correction, and then to take it to be the second displacement data (surface texture data).

In the first embodiment, the first displacement data and the second displacement data are output as they are. In other words, in the first embodiment, it is possible to simultaneously obtain the contour data indicated by the first displacement data and the surface texture data indicated by the second displacement data by one-time measurement.

FIG. 10 is a block diagram illustrating a configuration of a portion configured to perform signal processing and to make selection in a contour and surface texture measuring instrument of a second embodiment of the present invention.

As illustrated in FIG. 10, the contour and surface texture measuring instrument of the second embodiment has the scale signal processing unit 61, the differential transformer signal processing unit 62, and a selection unit 63. The scale signal processing unit 61 and the differential transformer signal processing unit 62 are the same as those of the first embodiment.

The selection unit 63 selects and outputs one of the first displacement data output from the scale signal processing unit 61 and the second displacement data output from the differential transformer signal processing unit 62 in accordance with the selection signal indicating which of the contour and the surface texture is measured. Specifically, in the case where the contour is measured, a signal to select the first displacement data is input as the selection signal and the selection unit 63 outputs the first displacement data output from the scale signal processing unit 61 as the detection data. In the case where the surface texture is measured, a signal to select the second displacement data is input as the selection signal and the selection unit 63 outputs the second displacement data output from the differential transformer signal processing unit 62 as the detection data. The selection signal is generated by, for example, a user of the contour and surface texture measuring instrument operating a processing selection button provided in the instrument.

In the second embodiment, the selection unit 63 selects and outputs one of the first displacement data and the second displacement data in accordance with the selection signal, but it is also possible to make selection by another method. In a third embodiment to be explained next, selection in the selection unit 63 is controlled by another method.

FIG. 11 is a block diagram illustrating a configuration of a portion configured to perform signal processing and to make selection and a diagram for explaining switching of selection signals in a contour and surface texture measuring instrument of the third embodiment of the present invention.

As illustrated in (A) of FIG. 11, the third embodiment has a configuration in which a selection control unit 69 configured to control selection in the selection unit 63 upon receipt of the first displacement data and the second displacement data is further provided in addition to the configuration of the second embodiment illustrated in FIG. 10. In (A) of FIG. 11, it is described that the selection control unit 69 receives both the first displacement data and the second displacement data, but there may be a case where one piece of the data is received.

As described previously, when the displacement becomes large, the error of the second displacement data output from the differential transformer signal processing unit 62 becomes greater. (B) of FIG. 11 illustrates an example of a change in the value of the second displacement data with respect to the actual displacement. As illustrated in (B) of FIG. 11, when the second displacement data is, for example, in a range between an upper limit threshold +Sh and a lower limit threshold −Sh, the value of the second displacement data changes with high linearity (linearly) with respect to the actual displacement. In contrast to this, in the range of the upper limit threshold +Sh or more and in the range of the lower limit threshold −Sh or less, the linearity deteriorates and the error becomes greater. Of course, it is possible to correct this error by calibration, but the error changes with time as well as changing in accordance with a change in environment, such as a change in temperature, and therefore, it is difficult to make correction with high accuracy. Because of this, the selection control unit 69 of the third embodiment controls the selection unit 63 so as to select the second displacement data in the case where the second displacement data is between the upper and lower limit thresholds ±Sh, in other words, where the displacement is between ±Th corresponding to ±Sh, and to select the first displacement data in the case where the second displacement data is outside the range between the upper and lower limit thresholds ±Sh, in other words, where the displacement is outside the range between ±Th.

It is also possible to determine whether the displacement is within or outside the range between the upper and lower limit thresholds ±Th based on the first displacement data output from the scale signal processing unit 61.

The case of the correction such as this corresponds to the case where correction by the first displacement data is not made based on the determination that linearity is maintained. Even the differential transformer-type detection mechanism that outputs the second displacement data premises the range in which linearity is maintained in the vicinity of zero and correction based on the first displacement data is not necessary. Which range is taken to be a range for correction depends on to which range the linearity of the second displacement data is regarded as being maintained in the calibration in advance.

When the contour is measured, there is a case where it is also required to simultaneously measure the surface texture. In such a case, conventionally, for example, after measuring the contour, the surface texture of the same surface was measured, and therefore, the measurement time was lengthened. In contrast to this, in the third embodiment, when the displacement is within the range between the upper and lower limit thresholds, the surface texture data is output and when the displacement is outside the range between the upper and lower limit thresholds, the contour data is output and the surface texture data can also be used as the contour data, and therefore, the contour data is obtained across the entire measurement range and at the same time, when the displacement is within the range between the upper and lower thresholds, the surface texture data is also obtained simultaneously as a result.

Figure 12:
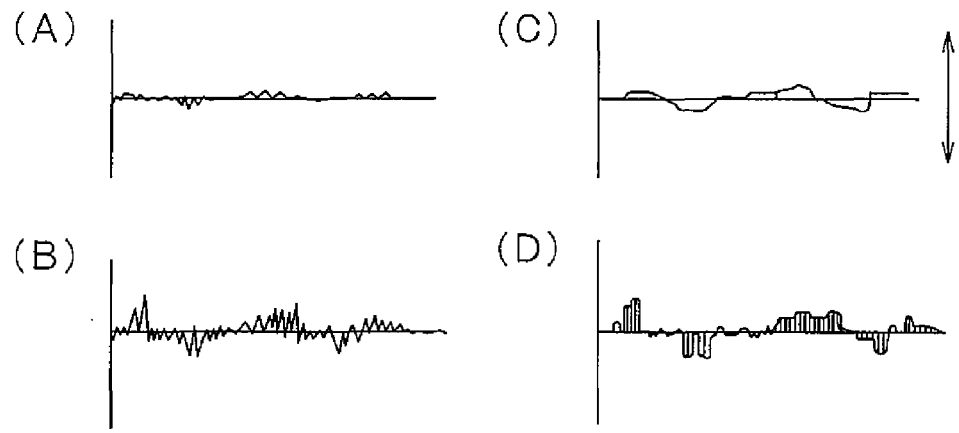
FIG. 12 is a diagram illustrating an example of second displacement data (surface texture data) and first displacement data (contour data) in the case where the displacement changes within a small range.

FIG. 12 is a diagram illustrating examples of the second displacement data (surface texture data) and the first displacement data (contour data) in the case where the displacement changes in a small range. (A) of FIG. 12 illustrates an example of the change in the second displacement data (surface texture data) and (B) of FIG. 12 illustrates the change in the second displacement data (surface texture data) in an enlarged view. (C) of FIG. 12 illustrates an example of the change in the first displacement data (contour data) and (D) of FIG. 12 illustrates the change in the first displacement data (contour data) in an enlarged view.

As illustrated in (B) of FIG. 12, the resolution of the second displacement data (surface texture data) is high, and therefore, the change is smooth even when enlarged. The resolution of the second displacement data (surface texture data) is, for example, 1 nm. In contrast to this, as illustrated in (D) of FIG. 12, the resolution of the first displacement data is low compared to that of the second displacement data, and therefore, the change is in the form of a step when enlarged. The resolution of the first displacement data (contour data) is, for example, 50 nm and has a sufficient resolution as the data indicating the contour. Because of this, in the case where the contour is indicated, there is no problem and even if the first displacement data is output as data indicating the contour in the case where the displacement is outside the range between the upper and lower limit thresholds in the third embodiment, there arises no problem in particular. Further, as illustrated in (B) and (D) of FIG. 12, the resolution of the first displacement data (contour data) is insufficient as the data indicating the surface texture. As described above, in the third embodiment, when the displacement is within the range between the upper and lower limit thresholds, the second displacement data (surface texture data) is output as the data indicating the contour, and therefore, it is also possible to measure the surface texture.

In the first to third embodiments, the detection signals output from the scale-type detection mechanism 52 and the differential transformer-type detection mechanism 51 are processed respectively and converted into the first and second displacement data, and then both pieces at the same time or one piece of the data is selected and output, the data to be output being the scale signal and the differential transformer signal.

However, although the scale signal (first displacement data) and the differential transformer signal (second displacement data) are different in resolution and sensitivity, they are the signals obtained by measuring the same portion of a work, and therefore, they are related to each other. Because of this, it is desirable to generate measurement data appropriate to a request by correcting the scale signal (first displacement data) and the differential transformer signal (second displacement data) with respect to each other. In an embodiment to be explained below, the correction processing such as this is performed.

As described previously, although not having a high resolution, the scale signal output from the scale-type detection mechanism 52 has high linearity across a wide detection range. On the other hand, although having a high resolution, the differential transformer signal output from the differential transformer-type detection mechanism 51 has insufficient linearity in a wide detection range. Consequently, the basic processing of correction is to create correction data so that the long period component of the differential transformer signal (second displacement data) agrees with the long period component of the scale signal (first displacement data) and to correct the differential transformer signal (second displacement data) by the amount corresponding to the correction data.

The correction processing may have various modification examples. First, there may be two cases: where the correction data generated based on the detection signals output from the differential transformer-type detection mechanism 51 and the scale-type detection mechanism 52 is output while the stylus 7 is caused to move at a fixed speed relative to the surface of the work W, i.e., the data is output in real time; and where the data is output after the movement of the stylus 7 relative to the surface of the work 7 in the measurement range is completed. First, the case where the data is output in real time is explained.

Figure 13:
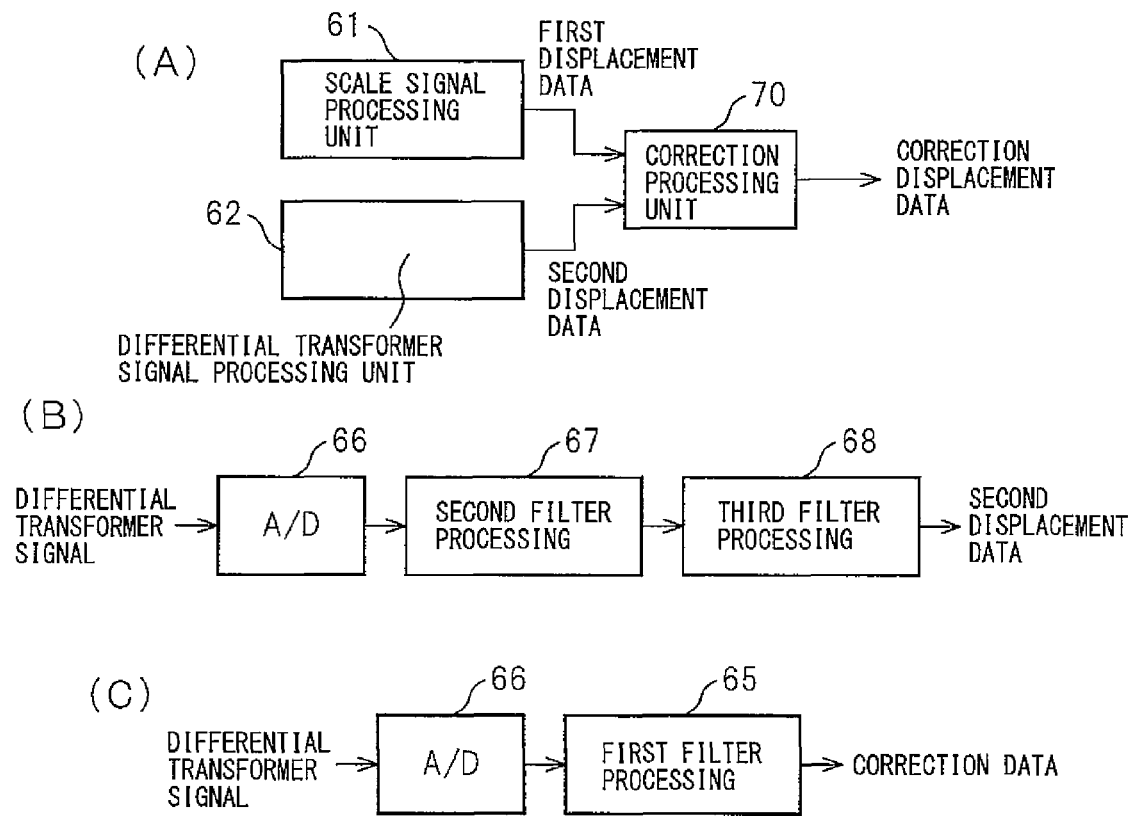
FIG. 13 is a diagram illustrating a configuration of a portion configured to process a signal and a correction unit of a fourth embodiment.

FIG. 13 is a block diagram illustrating a configuration of a portion configured to perform signal processing in a contour and surface texture measuring instrument of a fourth embodiment: in FIG. 13, (A) illustrates an overall configuration, (B) illustrates a configuration of the differential transformer signal processing unit 62, and (C) illustrates another configuration of the differential transformer signal processing unit 62.

As illustrated in (A) of FIG. 13, the portion configured to perform signal processing has the scale signal processing unit 61, the differential transformer signal processing unit 62, and a correction processing unit 70.

The scale signal processing unit 61 has the configuration illustrated in (B) of FIG. 8 and as in the first to third embodiments, processes the detection signal output from the scale-type detection mechanism 52 and generates and outputs the first displacement data to the correction processing unit 70. The first displacement data is used to correct the linearity of the second displacement data output from the differential transformer signal processing unit 62 and correction is made by utilizing the displacement component in the long distance of the scale signal, i.e., the long period (long wavelength) component in terms of distance and time. Because of this, as in the first to third embodiments, the displacement component in the short distance, i.e., the short period (short wavelength) component is not necessary, and therefore, components having a predetermined wavelength or less are removed.

The differential transformer signal processing unit 62 processes the detection signal output from the differential transformer-type detection mechanism 51 and generates and outputs the second displacement data to the correction unit 70. As in the first to third embodiments, the differential transformer signal processing unit 62 has the configuration illustrated in (C) of FIG. 8 and it is possible to perform the same processing as the processing conventionally performed on the detection signal output from the differential transformer-type detection mechanism 51 and to output the same displacement data as the conventional data as the second displacement data. However, the linearity is corrected by the first displacement data output from the scale signal processing unit 61, in other words, the long period (long wavelength) component is corrected, and therefore, the second displacement data is not necessary. Because of this, in the fourth embodiment, it is desirable to remove the long period (long wavelength) component.

Consequently, in the fourth embodiment, as illustrated in (B) of FIG. 13, the differential transformer signal processing unit 62 performs the A/D conversion processing 66 to convert a signal into a digital signal on the differential transformer signal, which is the detection signal output from the differential transformer-type detection mechanism 51, further performs the second filter processing 67 to remove distortion, noise, etc., of the stylus 7 on the digital signal, and then performs third filter processing 68 to remove the component having a wavelength or more corresponding to the spacing between correction points and generates the second displacement data. The second filter processing 67 is, for example, the same as the processing in (C) of FIG. 8.

In the third filter processing 68, the components having a wavelength or more, such as 0.08 mm, 0.25 mm, and 0.8 mm, are removed. In other words, in the third filter processing 68, filter processing opposite to the first filter processing 65 in (B) of FIG. 8 is performed. Consequently, in the fourth embodiment, band pass filter processing is performed in the differential transformer signal processing unit 62 as a result.

Further, as will be described later, there is a case where removal of short wavelength components is performed for the differential transformer signal as is performed for the scale signal in order to generate correction data, and in the case such as this, as illustrated in (C) of FIG. 13, the A/D conversion processing 66 to convert a signal into a digital signal is performed on the differential transformer signal, and further, the first filter processing 65 is performed on the digital signal, and processing to generate correction data is performed separately.

The correction unit 70 makes correction so as to match the long period component of the second displacement data with the first displacement data.

Figure 14:
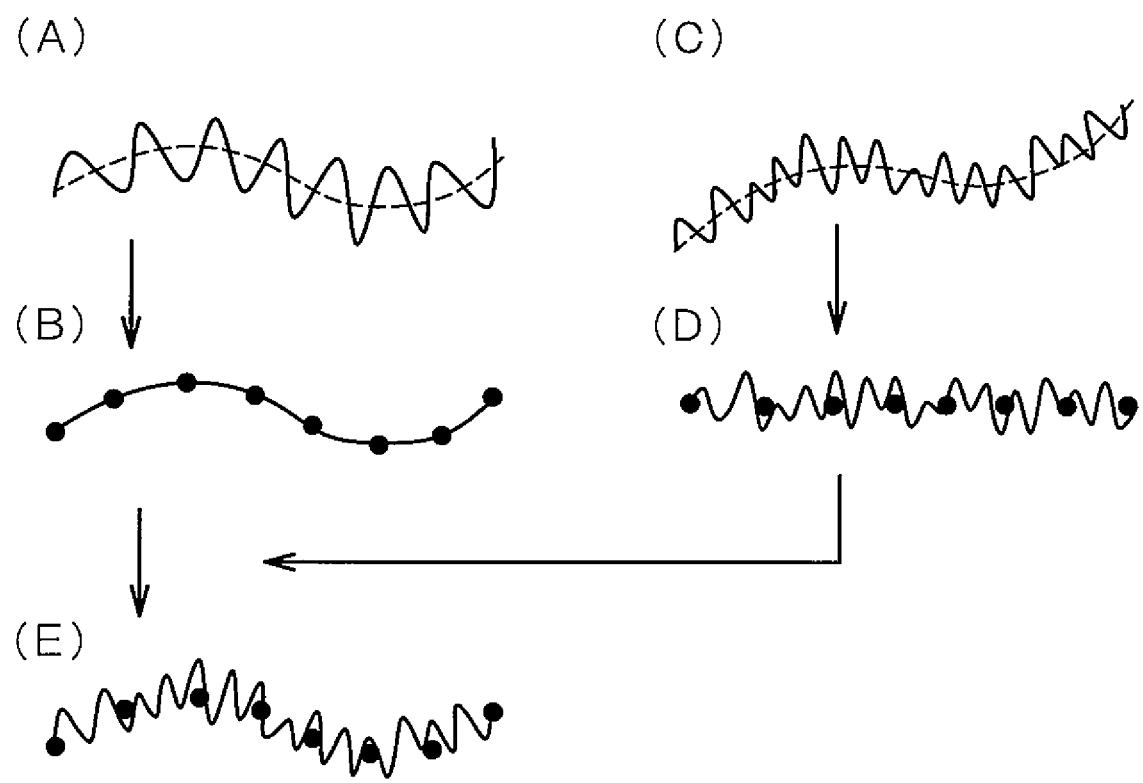
FIG. 14 is a diagram explaining signal processing and correction processing in the fourth embodiment.

FIG. 14 is a diagram explaining signal processing and correction processing in the fourth embodiment.

(A) of FIG. 14 illustrates a scale signal output from the scale-type detection mechanism 52 or a digital signal obtained by carrying out A/D conversion thereof. By performing the first filter processing 65 on this signal, the first displacement data from which the short wavelength component is removed as in (B) of FIG. 14 is obtained.

On the other hand, (C) of FIG. 14 illustrates a differential transformer signal output from the differential transformer-type detection mechanism 51 or a digital signal obtained by carrying out A/D conversion thereof. By performing the second filter processing 67 and the third filter processing 68 on this signal, the second displacement data in which only the intermediate wavelength component is left and from which other short wavelength and long wavelength components are removed as in (D) of FIG. 14 is obtained.

The correction unit 70 makes correction so that the displacement of the long wavelength of the first displacement data in (B) of FIG. 14 and that of the second displacement data in (D) of FIG. 14 agree with each other. Specifically, correction is made so that the height and slope of the first displacement data in (B) of FIG. 14 and those of the second displacement data in (D) of FIG. 14 agree with each other in each position. The correction may be made continuously or may be made discretely so as to match the value of a correction point (indicated by a black circle) of the second displacement data in (D) of FIG. 14 with the value of the correction point in (B) of FIG. 14. Due to this, the correction displacement data illustrated in (E) of FIG. 14 is obtained.

The correction requires finding long wavelength components of the scale signal and the differential transformer signal, and therefore, it is necessary to perform sampling, to a certain degree, of the displacement signal after the position where correction is made, and further, the arithmetic operation processing takes some time. Because of this, the correction data is output in real time, but delayed by a certain time.

In the example described above, the long wavelength component is generated by the filter processing of the scale signal, but it is also possible to generate contour data from which steps are removed by the moving average of the displacement data obtained by carrying out A/D conversion of the scale signal, the least square line, the spline curve, or the like, of data of a predetermined number of samples immediately before.

Figure 15:
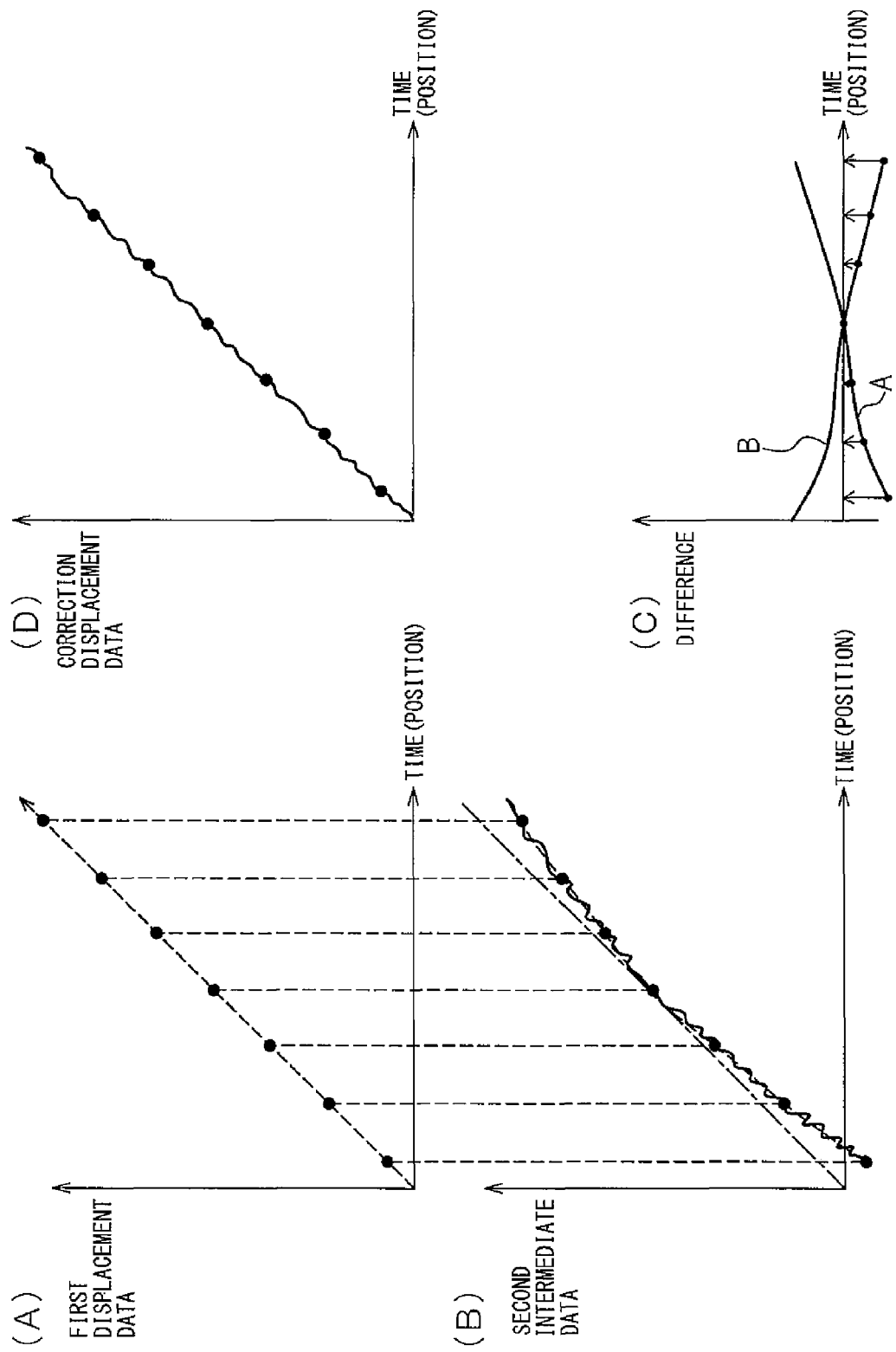
FIG. 15 is a diagram explaining signal processing and correction processing in the fourth embodiment.

FIG. 15 is a diagram further explaining the signal processing and the correction processing. FIG. 15 is a diagram giving explanation using a case where the first correction data (scale signal) monotonically increases, such as a case where a gently inclined plane is measured, as an example.

As illustrated in (A) of FIG. 15, the value of the first displacement data (scale signal) increases linearly. In contrast to this, it is assumed that in the differential transformer signal before the third filter processing 68 is performed, as illustrated in (B) of FIG. 15, the average values agree with the first displacement data in the vicinity of the middle point, but in the regions on both sides, the values are smaller than the first displacement data. In this case, for example, if the first filter processing is performed on the differential transformer signal as illustrated in (C) of FIG. 13, the change in the average value illustrated in (B) of FIG. 15 is obtained. When a difference between the value obtained by performing the first filter processing on the differential transformer signal and the first displacement data is calculated, the change indicated by A in (C) of FIG. 15 will result. If the sign of A is reversed, the correction data as indicated by B is obtained, and therefore, by adding the correction data to the second displacement data, the correction displacement data illustrated in (D) of FIG. 15 is obtained.

Figure 16:
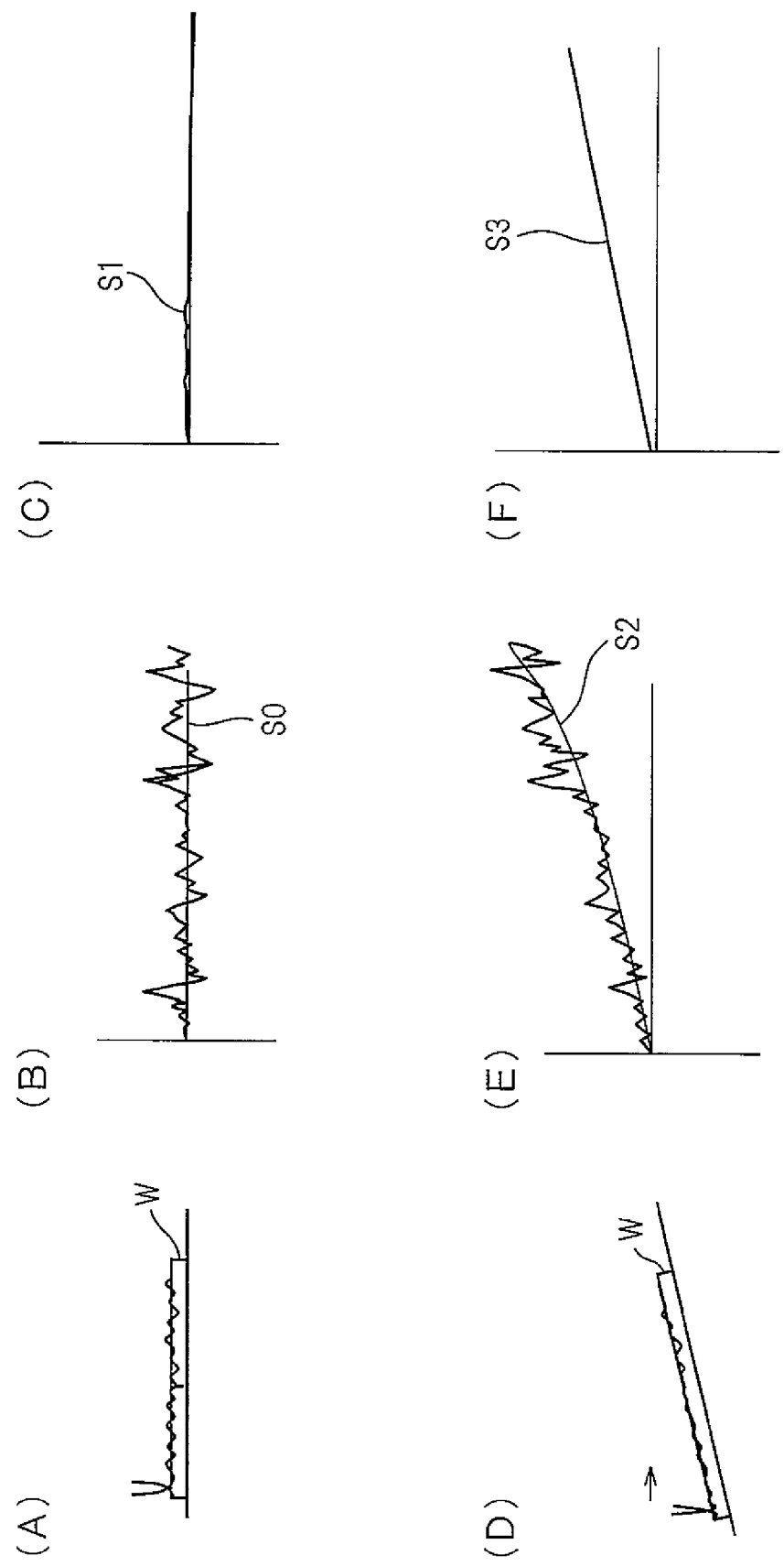
FIG. 16 is a diagram illustrating a processing example of signal processing and correction processing in the fourth embodiment.
Figure 17:
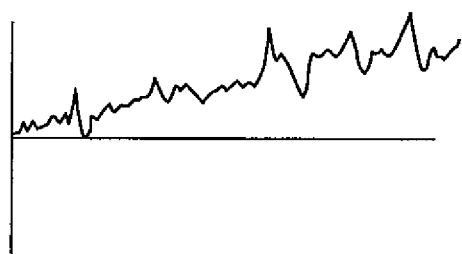
FIG. 17 is a diagram illustrating a processing example of signal processing and correction processing in the fourth embodiment.

FIG. 16 and FIG. 17 are diagrams illustrating specific examples of measurement in the fourth embodiment.

In the work W to be measured, as illustrated in (A) of FIG. 16, the surface is a plane and has roughness of a certain degree. (B) of FIG. 16 illustrates the differential transformer signal or the second displacement data obtained by measuring the work W in the state of being kept horizontal. (C) of FIG. 16 illustrates the scale signal or the first displacement data obtained by measuring the work W in the state of being kept horizontal.

(D) of FIG. 16 illustrates the state where the above-mentioned work W is kept inclined. (E) of FIG. 16 illustrates the differential transformer signal or the second displacement data obtained by measuring the work W in the state of being kept inclined. (F) of FIG. 16 illustrates the scale signal or the first displacement data obtained by measuring the work W in the state of being kept inclined.

As illustrated in (B) of FIG. 16, a least square line SO of the second displacement data obtained by measuring the work W kept horizontal agrees with the reference line indicating the zero level. Similarly, as illustrated in (C) of FIG. 16, a least square line S1 of the first displacement data obtained by measuring the work W kept horizontal also agrees with the reference line. As illustrated in (E) of FIG. 16, a least square line S2 of the second displacement data obtained by measuring the work W kept inclined has an angle corresponding to the inclination angle with respect to the reference line, but is not a perfect straight line. As illustrated in (F) of FIG. 16, a least square line S3 of the first displacement data obtained by measuring the work W kept inclined is a straight line having an angle corresponding to the inclination angle with respect to the reference line.

The correction unit 70 generates correction data so that the least square line S2 in (E) of FIG. 16 agrees with the least square line S3 in (F) of FIG. 16. The first displacement data corrected by the correction data will be as illustrated in FIG. 17. Due to this, a surface texture signal having high linearity in a wide range is obtained.

As described above, continuous correction data may be calculated, but the long wavelength component is corrected, and therefore, even if correction is made discretely, there arises no problem. Because of this, for example, in (A) to (D) of FIGS. 15, only the correction points indicated by black circles may be corrected so that the first correction data and the second correction data agree with each other and the part between correction points may be corrected linearly. The interval between correction points is determined so that the deviation in linearity of the differential transformer signal in the interval is a predetermined value (narrow range error) or less.

Specifically, the scale signal is read at constant pitch intervals and an inclination for each pitch is found and at the same time, the differential transformer signal is divided by the pitch interval and a coefficient is multiplied so that the average inclination between pitches of the differential transformer signal agrees with the inclination for each pitch of the scale signal. The average inclination between pitches of the differential transformer signal is calculated by, for example, the least square line, the spline curve, or the like. Then, two pieces of data are overlapped so that the end points between pitches agree and thus the correction displacement data is calculated.

In another method for producing an output in real time, the difference between the long wavelength components of the differential transformer detection mechanism 51 and the scale detection mechanism is measured in advance, the difference measured by the correction unit 70 is stored as correction data, and the correction displacement data is generated by adding the correction data to the second displacement data output from the differential transformer signal processing unit 62. It is desirable to perform measurement of the difference between the long wavelength components of the differential transformer detection mechanism 51 and the scale detection mechanism when necessary in order to update the correction data.

To the measurement of the difference between the long wavelength components of the differential transformer detection mechanism 51 and the scale detection mechanism, the method for continuously generating correction data explained in FIG. 15 described above and the method for discretely generating correction data can be applied, but it is not necessary to perform measurement in real time, and therefore, it is possible to obtain correction data of high accuracy by spending time. Further, it may also be possible to update correction data by calculating the difference between the long wavelength components of the differential transformer detection mechanism 51 and the scale detection mechanism from the data at the previous time of measurement.

In the case where correction data is stored, it is necessary to store the measurement data in the entire detection range, and therefore, for example, the inclined surface of a work having good straightness is measured in advance and the scale signal and the differential transformer signal as illustrated in (A) and (B) of FIG. 15 are generated, and processing to leave only long wavelength components is performed on both the signals and thus the difference between two pieces of data is calculated. Based on the calculated difference, a polynomial to approximate the difference for the value of the differential transformer signal is calculated and stored, or a lookup table obtained by mapping the difference onto the value of the differential transformer signal is created and stored.

In the case where measurement is performed actually, the correction displacement data is calculated by adding the difference to the value of the differential transformer signal by calculating the difference by utilizing the polynomial stored for the value of the differential transformer signal or by reading the difference stored in the lookup table for the value of the differential transformer signal.

In the case where the correction displacement data is generated not in real time but is generated after the movement of the stylus 7 through the entire measurement range ends also, the same processing as that described above can be applied, but there is a margin in the processing time, and therefore, processing with higher accuracy is enabled.

In the case where correction is made discretely at correction points, the scale signal is required only to be capable of detecting the displacement at the correction point with high accuracy. Because of this, with the optical scale-type detection mechanism, it is not necessary for the black and white pattern to exist continuously but to exist in correspondence to the correction point.

Figure 18:
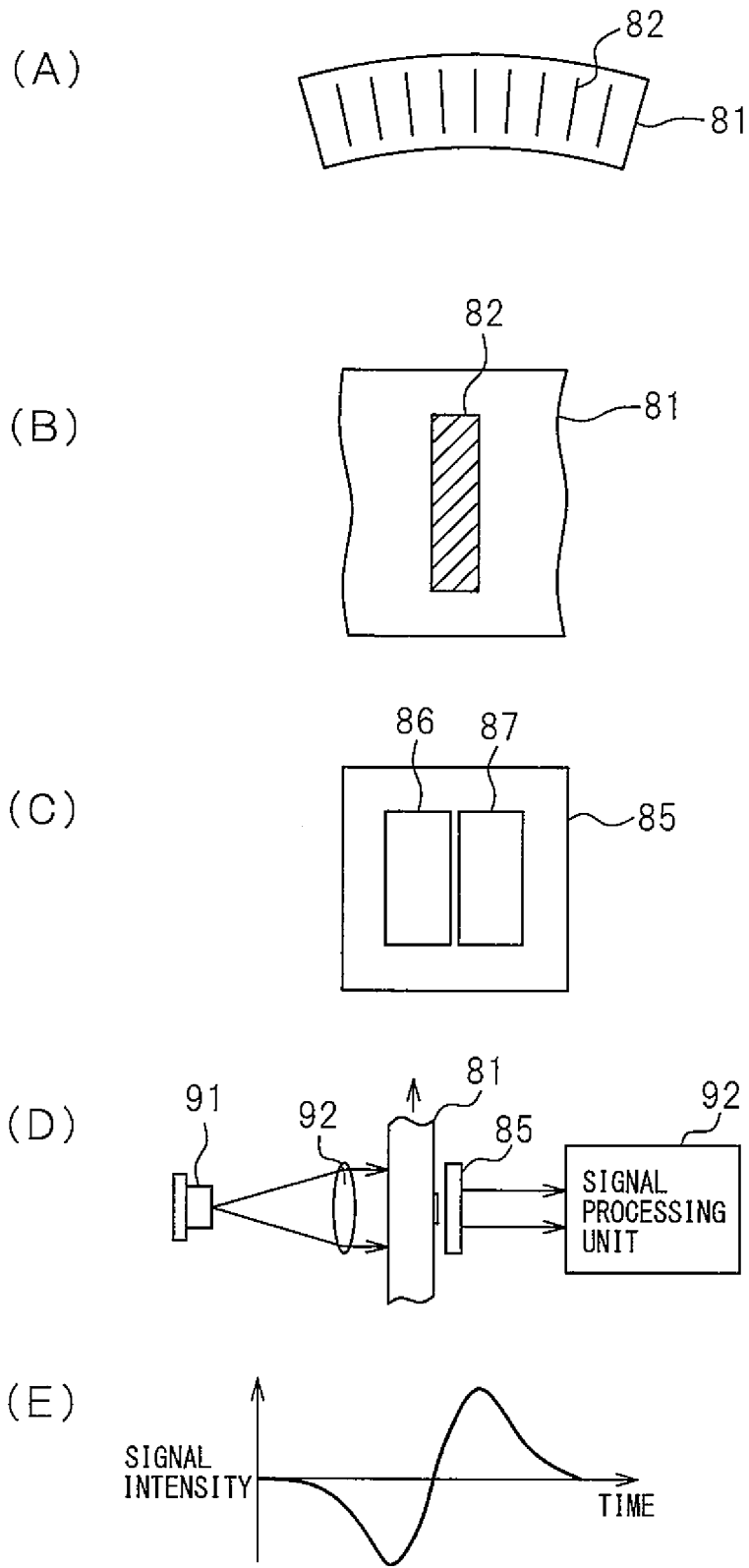
FIG. 18 is a diagram illustrating an example of an optical scale-type detection mechanism configured to discretely detect a displacement with high accuracy.

FIG. 18 is a diagram illustrating an example of the optical scale-type detection mechanism for discretely detecting the displacement with high accuracy.

As illustrated in (A) of FIG. 18, in a scale 81, a plurality of black lines 82 is formed radially with spacing therebetween with the pivot 16 as a center. (B) of FIG. 18 is a diagram illustrating one black line 82 and its periphery is transparent.

(C) of FIG. 18 illustrates a light receiving element 85 and the light receiving element 85 is a two-divided element and has two light receiving units 86 and 87 having the same shape and the same characteristics.

As illustrated in (D) of FIG. 18, a detection unit is provided so as to sandwich the scale 81 and the detection unit has a light source 91, a lens 91 configured to turn the light from the light source 91 into parallel light, the light receiving element 85 provided near to the side on which the black lines 82 of the scale 81 are formed, and a signal processing unit 90 configured to process the signal of the light receiving element 85. The signal processing unit 90 has an analog circuit configured to perform an arithmetic operation to find a difference between output signals of the two light receiving units 86 and 87 of the light receiving element 85.

As illustrated in (E) of FIG. 18, when the black line 82 does not exist before the two light receiving units 86 and 87, the outputs of the two light receiving units 86 and 87 have the same intensity and the difference signal will be zero. When the black line 82 begins to overlap one of the two light receiving units 86 and 87, the output of one of the two light receiving units 86 and 87 reduces and the difference signal begins to reduce, for example. Then, when the black line 82 overlaps one of the two light receiving units 86 and 87, the difference signal reaches the minimum. After that, when the black line 81 further mores, the overlap with one of the two light receiving units 86 and 87 reduces and the output increases, and on the other hand, the black line 81 begins to overlap the other, and therefore, the output of the other reduces and the difference signal increases abruptly. Then, when the black line 81 equally overlaps the two light receiving units 86 and 87, the difference signal will be zero. After that, when the black line 82 further moves and overlaps the other of the two light receiving units 86 and 87, the difference signal reaches the maximum and after that, the difference signal reduces and reaches zero. Consequently, the zero cross can be determined with high accuracy and the point is taken to be the correction point. By calibrating the position where the signal zero-crosses for the scale 81 in which the black lines 82 are formed, it is possible to exactly find the absolute displacement of the correction point.

Figure 19:
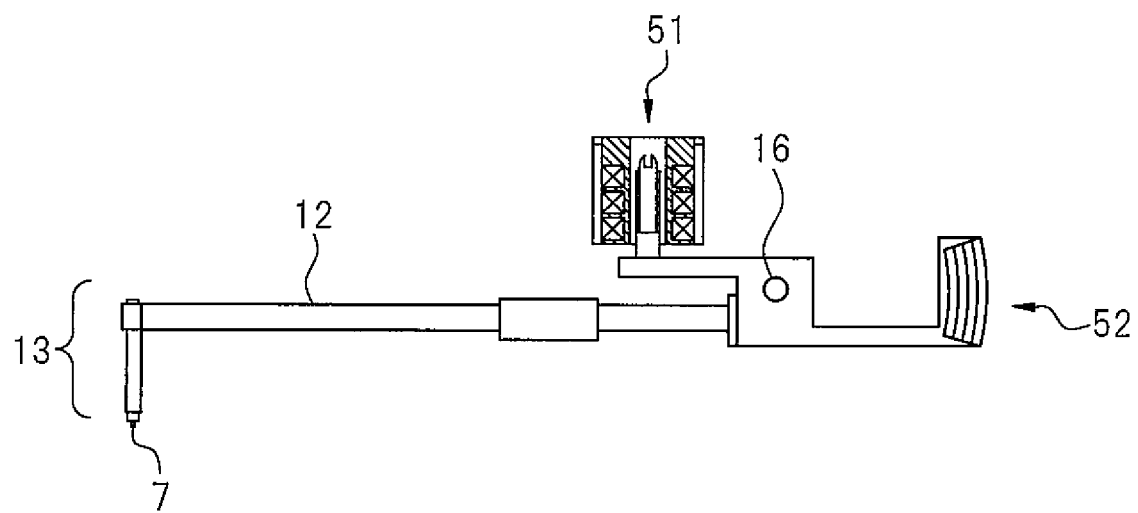
FIG. 19 is a diagram illustrating a configuration of a displacement detector in which a differential transformer-type detection mechanism is provided on the same side of a probe.

The position of the holder 14 and the probe 13 of the differential transformer detection mechanism 51 and the scale detection mechanism 52 can be set arbitrarily. For example, in FIG. 7, the differential transformer detection mechanism 51 and the scale detection mechanism 52 are provided on the opposite side of the probe 13 with respect to the pivot 16, but it is also possible to provide the differential transformer detection mechanism 51 on the same side as that of the probe 13 as illustrated in FIG. 19. Due to this, it is possible to reduce the rotation moment of the two sensors with respect to the pivot 16 and to reduce the mass to cause the probe 13 to have a specified measurement pressure. As a result of that, it is possible to improve responsibility by reducing the mass of the rocking unit rotatably supported by the pivot.

As above, the embodiments are explained, but it is needless to say that there can be various modification examples.

For example, as the scale detection mechanism 52, it is possible to use various-types and forms and there can also be various kinds of modification examples of the signal processing.

INDUSTRIAL APPLICABILITY

The present invention can be applied to a contour and surface texture measuring instrument.

EXPLANATIONS OF LETTERS OR NUMERALS 6 displacement detector
7 probe
8 mounting table
12 arm
13 measurement part
14 holder
16 pivot
51 differential transformer-type detection mechanism
52 scale-type detection mechanism

The invention claimed is:

1. A contour and surface texture measuring instrument for measuring a contour and surface texture of a surface of a work, the measuring instrument comprising:
    a stylus configured to come into contact with the surface of the work and to change its position vertically by a displacement amount;
    a feed mechanism to move the work with respect to the stylus;
    an arm including the stylus at one end to transfer a displacement amount of the stylus and to rotate around pivot; and
    a differential transformer-type measuring mechanism and a scale-type measuring mechanism to measure the displacement amount of the stylus by measuring a displacement amount of the arm; wherein
    the differential transformer-type measuring mechanism and the scale-type measuring mechanism simultaneously measure the displacement amount of the stylus probe.

2. The contour and surface texture measuring instrument according to claim 1, wherein
    the differential transformer-type measuring mechanism and the scale-type measuring mechanism are arranged at the same side of the arm.

3. The contour and surface texture measuring instrument according to claim 1, wherein
    the differential transformer-type measuring mechanism measures a high frequency component corresponding to a minute displacement amount of the stylus corresponding to a, roughness of the surface of the work, when the work is moved with respect to the stylus, and wherein
    the scale-type measuring mechanism detects a low frequency component corresponding to undulation of the surface of the work, when the work is moved with respect to the stylus.

4. The contour and surface texture measuring instrument according to claim 1, wherein the scale-type displacement measuring mechanism has an arc-shaped scale.

5. The contour and surface texture measuring instrument according to claim 1, further comprising a correction unit to generate a correction displacement signal by combining a detection signal of the differential transformer-type measuring mechanism and a detection signal of the scale-type measuring mechanism.

6. The contour and surface texture measuring instrument according to claim 5, wherein
    the correction unit corrects linearity in a wide range of said detection signal of the differential transformer-type measuring mechanism, based on said detection signal of the scale-type measuring mechanism.

7. A contour and surface texture measuring method for measuring a contour and surface texture of a surface of a work, the method comprising:
    providing a differential transformer-type measuring mechanism and a scale-type measuring mechanism for detecting a displacement amount of a stylus attached to one end of an arm, as a displacement of the arm, the stylus being configured to come into contact with the surface of the work and to change its position vertically;
    measuring displacement amount of the arm by the differential transformer-type measuring mechanism and the scale-type measuring mechanism by moving the work in a state where the stylus is in contact with the surface of the work; and
    measuring a contour and surface texture of the work based on displacement measuring results of the differential transformer-type measuring mechanism and the scale-type measuring mechanism.

* * * * *

UNITED STATES PATENT AND TRADEMARK OFFICE
CERTIFICATE OF CORRECTION

PATENT NO. : 9,074,865 B2  Page 1 of 1
APPLICATION NO. : 14/363284
DATED : July 7, 2015
INVENTOR(S) : Yasuhiro Yamauchi et al.

It is certified that error appears in the above-identified patent and that said Letters Patent is hereby corrected as shown below:

In the Claims

Col. 21, line 43, Claim 1    After "rotate around",
                             Insert --a--

Col. 22, line 11, Claim 3    Delete "to a, roughness",
                             Insert --to a roughness--

Signed and Sealed this
Thirty-first Day of May, 2016

Michelle K. Lee
*Director of the United States Patent and Trademark Office*